United States Patent
Glaser

(10) Patent No.: US 10,778,906 B2
(45) Date of Patent: Sep. 15, 2020

(54) SERIES-CONFIGURED CAMERA ARRAY FOR EFFICIENT DEPLOYMENT

(71) Applicant: Grabango Co., Berkeley, CA (US)

(72) Inventor: William Glaser, Berkeley, CA (US)

(73) Assignee: Grabango Co., Berkeley, CA (US)

( * ) Notice: Subject to any disclaimer, the term of this patent is extended or adjusted under 35 U.S.C. 154(b) by 0 days.

(21) Appl. No.: 15/976,850

(22) Filed: May 10, 2018

(65) Prior Publication Data

US 2018/0332235 A1    Nov. 15, 2018

Related U.S. Application Data

(60) Provisional application No. 62/504,501, filed on May 10, 2017.

(51) Int. Cl.
| | | |
|---|---|---|
| *H04N 5/247* | (2006.01) | |
| *H04N 5/232* | (2006.01) | |
| *H04N 7/18* | (2006.01) | |
| *G08B 13/196* | (2006.01) | |
| *H04N 5/225* | (2006.01) | |

(52) U.S. Cl.
CPC ....... *H04N 5/247* (2013.01); *G08B 13/19641* (2013.01); *G08B 13/19645* (2013.01); *G08B 13/19656* (2013.01); *H04N 5/2254* (2013.01); *H04N 5/2257* (2013.01); *H04N 5/2259* (2013.01); *H04N 5/23206* (2013.01); *H04N 5/23241* (2013.01); *H04N 5/23296* (2013.01); *H04N 7/181* (2013.01); *H04N 5/2252* (2013.01)

(58) Field of Classification Search
None
See application file for complete search history.

(56) References Cited

U.S. PATENT DOCUMENTS

| | | |
|---|---|---|
| 5,254,853 A | 10/1993 | Reich |
| 5,418,567 A | 5/1995 | Boers et al. |
| 6,970,183 B1 | 11/2005 | Monroe |
| 6,996,460 B1 | 2/2006 | Krahnstoever et al. |
| 7,053,915 B1 | 5/2006 | Jung et al. |
| 7,225,414 B1 | 5/2007 | Sharma et al. |
| 7,227,976 B1 | 6/2007 | Jung et al. |
| 7,274,803 B1 | 9/2007 | Sharma et al. |
| 7,283,650 B1 | 10/2007 | Sharma et al. |

(Continued)

FOREIGN PATENT DOCUMENTS

| | | |
|---|---|---|
| EP | 3454698 A1 | 3/2019 |
| WO | 2019032304 A1 | 2/2019 |

OTHER PUBLICATIONS

IP.com Search Report.*

(Continued)

*Primary Examiner* — Mohammad J Rahman
(74) *Attorney, Agent, or Firm* — Alpine Patents LLC; Brian Van Osdol

(57) ABSTRACT

A system and method for outfitting an environment with a camera array that includes: a set of camera modules mounted and interconnected as a monitoring network within the environment; wherein each camera module instance of the set of camera modules comprises of: at least one camera, and at least a first connection port and second connection port; and wherein the camera modules of the set of camera modules serially connect through the connection ports of adjacent camera modules.

19 Claims, 26 Drawing Sheets

(56) References Cited

U.S. PATENT DOCUMENTS

| | | |
|---|---|---|
| 7,319,779 B1 | 1/2008 | Mummareddy et al. |
| 7,505,621 B1 | 3/2009 | Agrawal et al. |
| 7,590,261 B1 | 9/2009 | Mariano et al. |
| 7,711,155 B1 | 5/2010 | Sharma et al. |
| 7,734,070 B1 | 6/2010 | Sharma et al. |
| 7,848,548 B1 | 12/2010 | Moon et al. |
| 7,911,482 B1 | 3/2011 | Mariano et al. |
| 7,912,246 B1 | 3/2011 | Moon et al. |
| 7,921,036 B1 | 4/2011 | Sharma et al. |
| 7,930,204 B1 | 4/2011 | Sharma et al. |
| 7,957,565 B1 | 6/2011 | Sharma et al. |
| 7,974,869 B1 | 7/2011 | Sharma et al. |
| 7,987,111 B1 | 7/2011 | Sharma et al. |
| 8,009,863 B1 | 8/2011 | Sharma et al. |
| 8,010,402 B1 | 8/2011 | Sharma et al. |
| 8,027,521 B1 | 9/2011 | Moon et al. |
| 8,098,888 B1 | 1/2012 | Mummareddy et al. |
| 8,189,926 B2 | 5/2012 | Sharma et al. |
| 8,219,438 B1 | 7/2012 | Moon et al. |
| 8,254,633 B1 | 8/2012 | Moon et al. |
| 8,295,597 B1 | 10/2012 | Sharma et al. |
| 8,325,982 B1 | 12/2012 | Moon et al. |
| 8,351,647 B2 | 1/2013 | Sharma et al. |
| 8,379,937 B1 | 2/2013 | Moon et al. |
| 8,380,558 B1 | 2/2013 | Sharma et al. |
| 8,396,758 B2 | 3/2013 | Paradise et al. |
| 8,412,656 B1 | 4/2013 | Baboo et al. |
| 8,433,612 B1 | 4/2013 | Sharma et al. |
| 8,448,859 B2 | 5/2013 | Goncalves et al. |
| 8,520,906 B1 | 8/2013 | Moon et al. |
| 8,577,705 B1 | 11/2013 | Baboo et al. |
| 8,812,344 B1 | 8/2014 | Saurabh et al. |
| 9,120,621 B1 | 9/2015 | Curlander et al. |
| 9,141,931 B2 | 9/2015 | Ackerman |
| 9,161,084 B1 | 10/2015 | Sharma et al. |
| 9,262,681 B1 | 2/2016 | Mishra |
| 9,270,634 B1 | 2/2016 | Gu et al. |
| 9,317,785 B1 | 4/2016 | Moon et al. |
| 9,412,099 B1 | 8/2016 | Tyree |
| 9,426,720 B2 | 8/2016 | Cohn et al. |
| 9,474,934 B1 | 10/2016 | Krueger et al. |
| 9,740,977 B1 | 8/2017 | Moon et al. |
| 9,747,497 B1 | 8/2017 | Sharma et al. |
| 9,892,438 B1 | 2/2018 | Kundu et al. |
| 9,911,290 B1 | 3/2018 | Zalewski et al. |
| 9,948,902 B1 | 4/2018 | Trundle |
| 10,055,853 B1 | 8/2018 | Fisher et al. |
| 10,083,358 B1 | 9/2018 | Shin et al. |
| 10,127,438 B1 | 11/2018 | Fisher et al. |
| 10,133,933 B1 | 11/2018 | Fisher et al. |
| 10,198,625 B1 | 2/2019 | Shin et al. |
| 10,217,120 B1 | 2/2019 | Shin et al. |
| 10,262,331 B1 | 4/2019 | Sharma et al. |
| 10,296,936 B1 | 5/2019 | Saurabh et al. |
| 10,339,595 B2 | 7/2019 | Glaser et al. |
| 10,347,009 B1 | 7/2019 | Terven et al. |
| 10,354,262 B1 | 7/2019 | Hershey et al. |
| 10,387,896 B1 | 8/2019 | Hershey et al. |
| 2001/0010541 A1* | 8/2001 | Fernandez ....... G08B 13/19608 348/143 |
| 2002/0122559 A1 | 9/2002 | Fay et al. |
| 2003/0210340 A1 | 11/2003 | Romanowich |
| 2003/0216969 A1 | 11/2003 | Bauer et al. |
| 2004/0201754 A1 | 10/2004 | McAlister |
| 2005/0096997 A1 | 5/2005 | Jain et al. |
| 2005/0189411 A1 | 9/2005 | Ostrowski et al. |
| 2006/0032915 A1 | 2/2006 | Schwartz |
| 2006/0147087 A1 | 7/2006 | Goncalves et al. |
| 2007/0091177 A1 | 4/2007 | West et al. |
| 2007/0146873 A1 | 6/2007 | Ortyn et al. |
| 2007/0242300 A1* | 10/2007 | Inai ....................... G06F 1/3221 358/1.14 |
| 2008/0226129 A1 | 9/2008 | Kundu et al. |
| 2008/0228585 A1 | 9/2008 | Duri et al. |
| 2009/0195648 A1* | 8/2009 | Thomas ................. A01K 43/00 348/89 |
| 2010/0020173 A1 | 1/2010 | Marquart et al. |
| 2010/0255902 A1 | 10/2010 | Goldstein et al. |
| 2010/0295946 A1 | 11/2010 | Reed et al. |
| 2011/0122231 A1 | 5/2011 | Fujieda et al. |
| 2011/0215147 A1 | 9/2011 | Goncalves |
| 2012/0019168 A1 | 1/2012 | Noda et al. |
| 2012/0027297 A1 | 2/2012 | Feris et al. |
| 2012/0173351 A1 | 7/2012 | Hanson et al. |
| 2013/0103537 A1 | 4/2013 | Hewett |
| 2013/0147963 A1 | 6/2013 | Henninger et al. |
| 2013/0177201 A1 | 7/2013 | Fisher |
| 2013/0215116 A1 | 8/2013 | Siddique et al. |
| 2013/0223673 A1 | 8/2013 | Davis et al. |
| 2013/0284806 A1 | 10/2013 | Margalit |
| 2013/0290557 A1 | 10/2013 | Baratz |
| 2013/0317300 A1 | 11/2013 | Berci et al. |
| 2013/0335571 A1 | 12/2013 | Libal |
| 2013/0342688 A1 | 12/2013 | Siu |
| 2014/0082519 A1 | 3/2014 | Wang et al. |
| 2014/0082610 A1 | 3/2014 | Wang et al. |
| 2014/0129688 A1 | 5/2014 | Asenjo et al. |
| 2014/0245160 A1 | 8/2014 | Bauer et al. |
| 2014/0263631 A1 | 9/2014 | Muniz |
| 2014/0265880 A1 | 9/2014 | Taipale et al. |
| 2014/0272855 A1 | 9/2014 | Maser et al. |
| 2014/0279191 A1 | 9/2014 | Agarwal et al. |
| 2014/0285660 A1 | 9/2014 | Jamtgaard et al. |
| 2014/0297487 A1* | 10/2014 | Bashkin ............... G06Q 10/087 705/28 |
| 2014/0330408 A1 | 11/2014 | Rolley |
| 2014/0372957 A1 | 12/2014 | Keane et al. |
| 2015/0012396 A1 | 1/2015 | Puerini et al. |
| 2015/0019391 A1 | 1/2015 | Kumar et al. |
| 2015/0029339 A1 | 1/2015 | Kobres et al. |
| 2015/0039458 A1 | 2/2015 | Reid |
| 2015/0046213 A1 | 2/2015 | Doreswamy et al. |
| 2015/0077787 A1 | 3/2015 | Nishimura et al. |
| 2015/0077797 A1 | 3/2015 | Kurokawa |
| 2015/0088694 A1 | 3/2015 | Ackerman |
| 2015/0095189 A1 | 4/2015 | Dharssi et al. |
| 2015/0097961 A1 | 4/2015 | Ure et al. |
| 2015/0124973 A1 | 5/2015 | Arteaga et al. |
| 2015/0133190 A1 | 5/2015 | Fisher et al. |
| 2015/0154973 A1 | 6/2015 | McKenna et al. |
| 2015/0156332 A1 | 6/2015 | Kandregula |
| 2015/0163412 A1 | 6/2015 | Holley et al. |
| 2015/0227890 A1 | 8/2015 | Bednarek et al. |
| 2015/0244992 A1 | 8/2015 | Buehler |
| 2015/0310601 A1 | 10/2015 | Rodriguez et al. |
| 2015/0327045 A1 | 11/2015 | Chang et al. |
| 2015/0373509 A1 | 12/2015 | Wang et al. |
| 2016/0012379 A1 | 1/2016 | Iwai |
| 2016/0019514 A1* | 1/2016 | Landers, Jr. ......... G06Q 20/201 705/20 |
| 2016/0027262 A1 | 1/2016 | Skotty et al. |
| 2016/0037135 A1 | 2/2016 | McSheffrey et al. |
| 2016/0100086 A1 | 4/2016 | Chien |
| 2016/0110791 A1* | 4/2016 | Herring ............... G06Q 30/0609 705/26.61 |
| 2016/0112608 A1* | 4/2016 | Elensi ................... H04N 5/2252 348/143 |
| 2016/0173827 A1* | 6/2016 | Dannan ............ G08B 13/19645 348/143 |
| 2016/0217388 A1 | 7/2016 | Okanohara et al. |
| 2016/0224856 A1 | 8/2016 | Park et al. |
| 2016/0242252 A1 | 8/2016 | Lim et al. |
| 2016/0254864 A1 | 9/2016 | Mueller et al. |
| 2016/0270191 A1 | 9/2016 | Ludwig et al. |
| 2016/0282039 A1 | 9/2016 | Motukuri et al. |
| 2016/0289964 A1* | 10/2016 | Engberg ................... E04B 9/10 |
| 2016/0345414 A1 | 11/2016 | Nolan et al. |
| 2016/0358312 A1* | 12/2016 | Kolb, V ................. G06T 5/003 |
| 2017/0032182 A1 | 2/2017 | Motukuri et al. |
| 2017/0039613 A1 | 2/2017 | Kaehler et al. |
| 2017/0053171 A1 | 2/2017 | Buehler |
| 2017/0108236 A1 | 4/2017 | Guan et al. |
| 2017/0123030 A1 | 5/2017 | Hengerer et al. |

(56) References Cited

U.S. PATENT DOCUMENTS

| | | |
|---|---|---|
| 2017/0131781 A1 | 5/2017 | Buban |
| 2017/0161703 A1 | 6/2017 | Dodia |
| 2017/0169440 A1 | 6/2017 | Dey et al. |
| 2017/0178352 A1 | 6/2017 | Harmsen et al. |
| 2017/0188013 A1* | 6/2017 | Presler .................. H04N 5/225 |
| 2017/0216667 A1 | 8/2017 | Garvey et al. |
| 2017/0278175 A1 | 9/2017 | Park et al. |
| 2017/0316656 A1 | 11/2017 | Chaubard et al. |
| 2017/0323376 A1 | 11/2017 | Glaser et al. |
| 2017/0332956 A1 | 11/2017 | Bigolin et al. |
| 2018/0005044 A1 | 1/2018 | Olson |
| 2018/0012072 A1 | 1/2018 | Glaser et al. |
| 2018/0012080 A1 | 1/2018 | Glaser et al. |
| 2018/0088900 A1 | 3/2018 | Glaser et al. |
| 2018/0107968 A1 | 4/2018 | Wu et al. |
| 2018/0232796 A1 | 8/2018 | Glaser et al. |
| 2018/0240180 A1 | 8/2018 | Glaser et al. |
| 2018/0245736 A1* | 8/2018 | Patel .................. F16M 13/027 |
| 2018/0300553 A1 | 10/2018 | Khosla et al. |
| 2018/0322209 A1 | 11/2018 | Jin et al. |
| 2018/0332235 A1 | 11/2018 | Glaser |
| 2018/0332236 A1 | 11/2018 | Glaser et al. |
| 2018/0373928 A1 | 12/2018 | Glaser et al. |
| 2019/0005479 A1 | 1/2019 | Glaser et al. |
| 2019/0028643 A1* | 1/2019 | Oryoji .................. G03B 15/00 |
| 2019/0043003 A1 | 2/2019 | Fisher et al. |
| 2019/0054347 A1 | 2/2019 | Saigh et al. |
| 2019/0079591 A1 | 3/2019 | Glaser et al. |
| 2019/0114488 A1 | 4/2019 | Glazer et al. |
| 2019/0116322 A1 | 4/2019 | Holzer et al. |
| 2019/0156273 A1 | 5/2019 | Fisher et al. |
| 2019/0156274 A1 | 5/2019 | Fisher et al. |
| 2019/0156275 A1 | 5/2019 | Fisher et al. |
| 2019/0156276 A1 | 5/2019 | Fisher et al. |
| 2019/0156277 A1 | 5/2019 | Fisher et al. |
| 2019/0156506 A1* | 5/2019 | Fisher .................. G06F 3/14 |
| 2019/0205933 A1 | 7/2019 | Glaser et al. |
| 2020/0079412 A1 | 3/2020 | Ramanathan et al. |

OTHER PUBLICATIONS

Google Search Report.*

Elizabeth Weise: "How Amazon's line-less grocery services might really work", USATODAY, Dec. 8, 2016 (Dec. 8, 2016), Retrieved from the Internet: URL: https://eu.usatoday.com/story/tech/news/2016/12/06/amazon-go-surveillance-cameras-shopping-grocery-supermarket/95055200/ [retrieved on Feb. 21, 2020]*the whole document*.

* cited by examiner

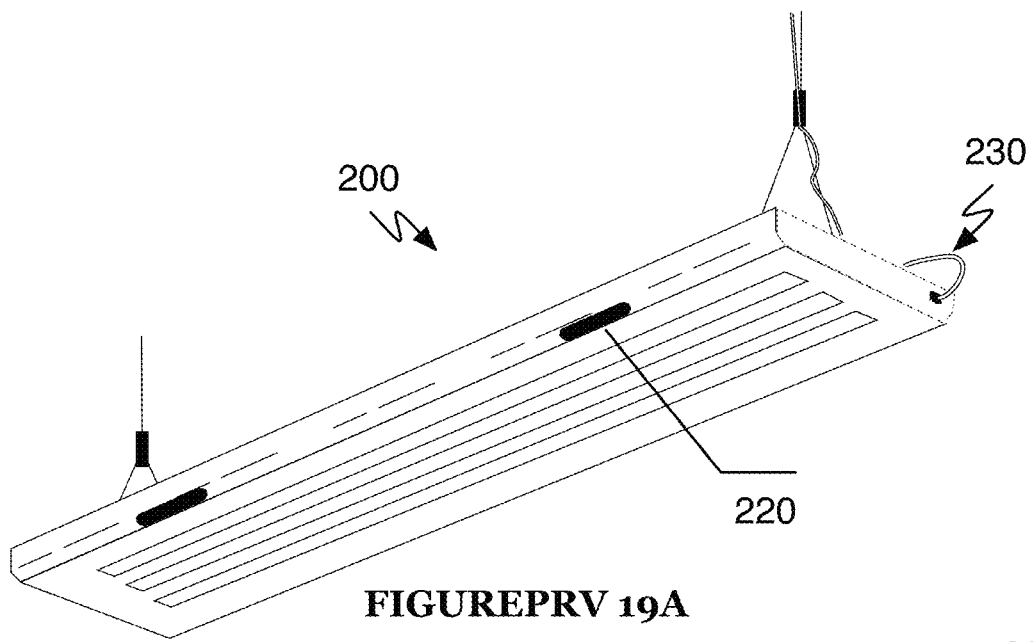
FIGUREPRV 19A
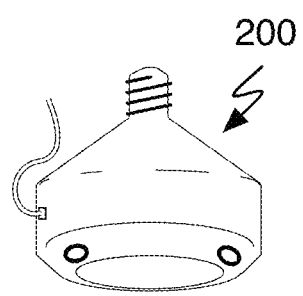
FIGUREPRV 19B
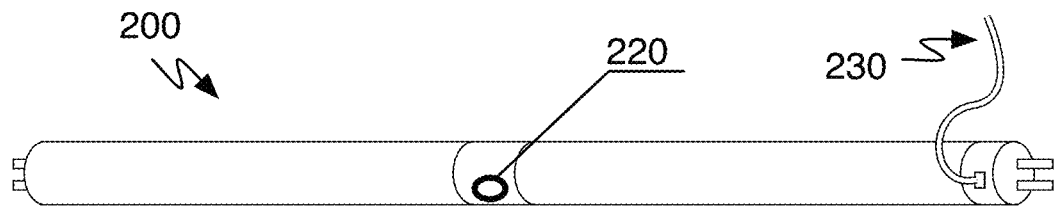
FIGUREPRV 19C

SERIES-CONFIGURED CAMERA ARRAY FOR EFFICIENT DEPLOYMENT

CROSS-REFERENCE TO RELATED APPLICATIONS

This Application claims the benefit of U.S. Provisional Application No. 62/504,501, filed on May 10, 2018, which is incorporated in its entirety by this reference.

TECHNICAL FIELD

This invention relates generally to the field of multi-camera systems, and more specifically to a new and useful system and method for outfitting an environment with a camera array.

BACKGROUND

There is an emerging field of technology for sensor-driven monitoring within an environment to drive various services and applications. As one example, recent technology developments have seen initial proposed systems directed towards enabling automatic checkout within a store by using computer vision, sometimes in combination with other forms of sensing. Many such implementations are limited in their wide spread use because of numerous factors including operational complexity and prohibitive system installation costs.

As one example, installing a multi-camera surveillance system in an environment such as a building can be a large project. The equipment involved can be expensive and often includes complex and expensive cameras. Similarly, the installation process or even the feasibility of installation is complicated when considering installation into an existing store with existing infrastructure (e.g., shelves, lights, venting, etc).

Additionally, a high level of training is required for workers to install a highly customized system. Even with training, setting up a system can be a long process since installing, aiming, calibrating, and configuring each camera can be an involved process. Maintenance of the system is similarly expensive and complex. Furthermore, when in active use, the multi-camera surveillance systems can generate large amounts of data that can, ironically, limit their uses. Thus, there is a need in the multi-camera system field to create a new and useful system and method for ubiquitous video monitoring across an environment. This invention provides such a new and useful system and method.

BRIEF DESCRIPTION OF THE FIGURES

FIG. 19A-19C are exemplary lighting integration form factors of different camera module variations;

DESCRIPTION OF THE EMBODIMENTS

Figure 1:
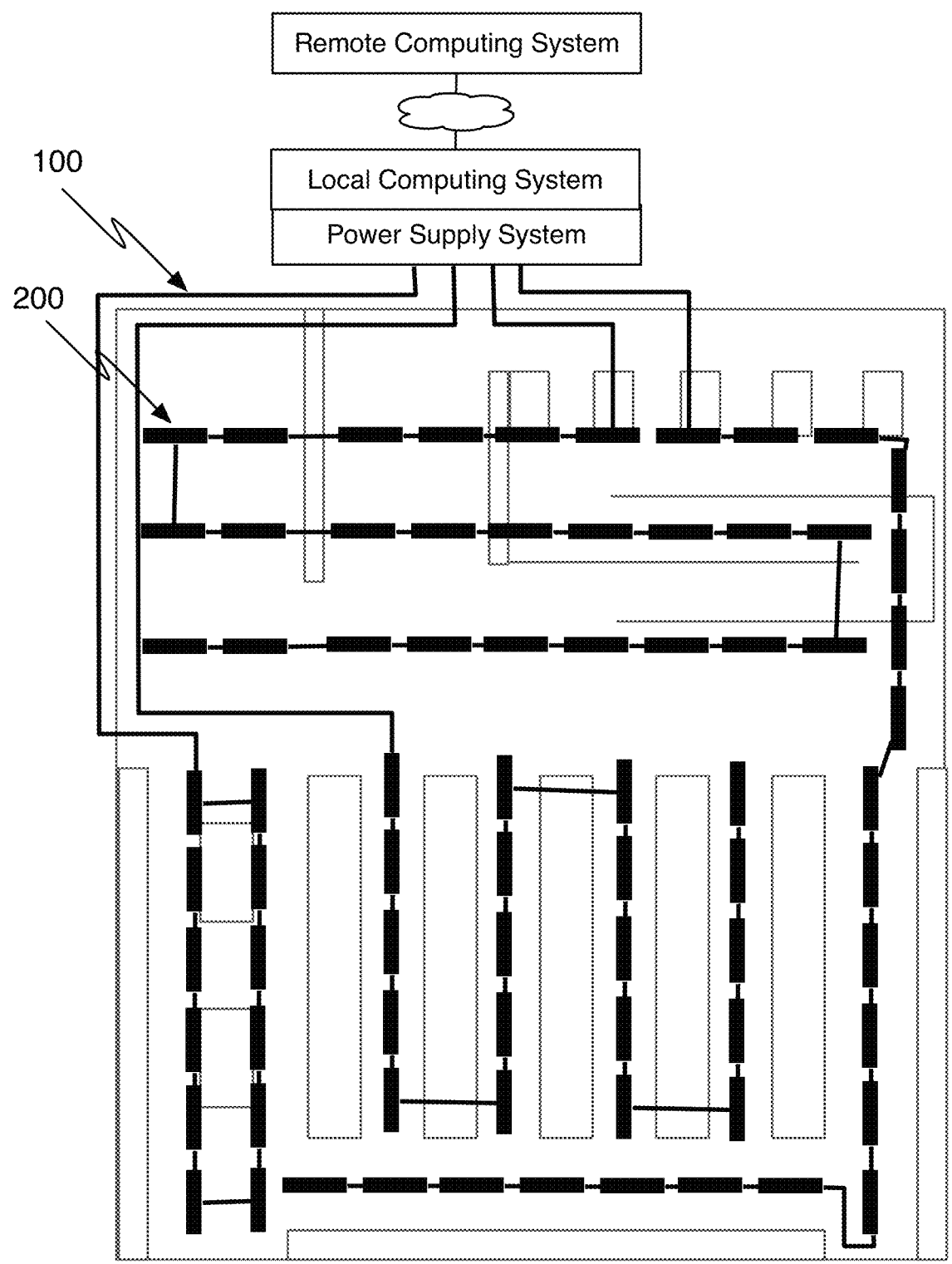
FIG. 1 is a schematic representation of an instantiation of the system.

The following description of the embodiments of the invention is not intended to limit the invention to these embodiments but rather to enable a person skilled in the art to make and use this invention.

1. Overview

A system and method for ubiquitous video monitoring across an environment functions to enable a network of cameras to be efficiently installed and operated for collecting media, in particular, video and still images. The collected media of the system is preferably used in large-scale computer vision (CV) driven applications. The system and method preferably involve the setup of multiple camera modules along, or suspended from, the ceiling region of an environment. The system and method may alternatively include installation across other regions and/or infrastructure of an environment. A particular attribute of the system and method is the use of easily installed camera modules, which can be daisy-chained or otherwise connected to form a monitoring network. When used within a commercial space or suitable environment, the monitoring network can be distributed across the ceiling and other regions for detailed visual monitoring. Other installation approaches may additionally or alternatively be used with the system and method.

The system is primarily described as a network for multiple video monitoring nodes. As used herein, 'video' might mean a common video format such as NTSC, PLA, MPEG, 4K, HEVC etc. Video may also mean a sequence of individual still images whose place in time is monotonic. Those images may similarly be in a wide range of formats, including Raw, JPG, PDF, GIF, BMP, HEIF, WebP, and/or other suitable media formats.

The system could additionally be applied to a single camera and/or audio monitoring and may additionally include other forms of sensing that may be used independently or in combination with video monitoring. These might include lidar, sonar, infrared, ultraviolet, radio frequency, capacitance, magnetic, scales, pressure, volume, climate sensing, and the like.

Similarly, the system and method may additionally or alternatively be used in distributing other computer input or output devices across an environment. The system and method can be used in the collection of sensor data and/or generation of an output in addition to or as an alternative to video and/or image data. Other forms of devices such as microphones, Bluetooth beacons, speakers, projectors, and other suitable devices could additionally or alternatively be integrated into system modules that may be installed across an environment. Herein, the system and method are primarily described as it relates to image-based video monitoring.

The system and method are preferably used for applications that utilize ubiquitous monitoring across an environment. Herein, ubiquitous monitoring (or more specifically ubiquitous video monitoring) characterizes pervasive sensor monitoring across regions of interest in an environment. Ubiquitous monitoring will generally have a large coverage area that is preferably substantially continuous though discontinuities of a region may be supported. Additionally, monitoring may monitor with a substantially uniform data resolution.

Large coverage, in one example, can be characterized as having greater than 95% of surface area of interest monitored. In a shopping environment this can mean the shelves and product displays as well as the shopping floor are monitored.

Substantial uniform data resolution preferably describes a sensing configuration where the variability of image resolution of different areas in the environment is within a target range. In the exemplary case of automatic checkout CV-driven applications, the target range for image resolution is sufficient to resolve product packaging details for product identification.

Ubiquitous monitoring may optionally include the characteristic of redundant monitoring. This may involve having redundant coverage from multiple vantage points. For example, an item on a shelf may be visible by two different cameras with adequate product identification resolution and where the cameras view the item from different perspectives. In an environment like a grocery store this could mean 10-200 cameras distributed per an aisle in some exemplary implementations.

While the system and method may have particular potential benefits to a large environment, the system and method has potential benefits and applications within small environments. Adaptability to different environments is an exemplary benefit of the system and method.

The system and method may be used for any suitable video monitoring application. In particular, the system and method is for CV-based computing applications, which may include automated self-checkout, inventory tracking, security surveillance, environmental event detection and tracking, and/or other suitable applications.

Herein, automatic checkout is used as the main exemplary application of the system and method, but any suitable application may be used. Automatic checkout is primarily characterized by a system or method that generates or maintains a virtual cart during the shopping process of a customer (or group of customers) with the objective of knowing the possessed items when a customer leaves a store or is ready for checkout. The system and method as described herein can be used to automatically generate an itemized checkout list for a customer. An automatic checkout system may additionally automatically charge an account of a customer for the total of a shopping cart. The automatic checkout system could alternatively be used to expedite entry of items for payment.

The system and method may alternatively be used to account for the removal of a good by a customer such as in a library, a rental store, a warehouse, or any suitable item storage facility. The system and method may alternatively be used to permit or restrict access to locations, or to charge for such access. The system can be made to work for a wide variety of shopping environments such as grocery stores, convenience stores, micro-commerce & unstaffed stores, bulk-item stores, pharmacies, bookstores, warehouses, malls, markets, and/or any suitable environment that promotes commerce or exchange of goods or services. In alternate cases, the system may be used in conjunction with law enforcement, or similar systems, to identify individuals who are not abiding by the rules of the systems.

As one potential benefit, the system, and in particular the camera modules, are preferably easily installed and activated. Physically, the camera modules can be mounted using standard fixtures used in many stores. In some instances this may involve using existing store infrastructure such as those for lighting systems, and repurposing those for installation of the camera modules. In other instances, it may involve standard device installation familiar to contractors and electricians installing lighting systems and other common devices. In some variations, the installation of the devices is substantially similar to the structural challenges of installing traditional lighting fixtures.

From an electronics perspective, the camera modules may simply need to be connected together with a set of cables. In some variations this may involve a set of data and power cables. In some variations, this may involve a single integrated cable for data and/or power connections such as using a power-over-ethernet (PoE) cable or a custom cable.

The system and method additionally prioritize automatic configuration over customized configuration. The camera modules can be substantially self-initializing and the network of camera modules can self-organize to coordinate environmental video monitoring. The self-calibration and configuration can minimize the amount of training for a worker installing the system. Such easy setup may be important to enabling an environment to come online with computer vision monitoring capabilities quickly. Additionally, the orientation and positioning of the cameras within the environment is made less necessarily precise. The form factor of the camera modules can simplify alignment and positioning of devices for desired ubiquitous monitoring. Camera alignment can be designed with specifications within the normal tolerances of standard contractor installations. Additionally, self-configuration reduces reliance on specialized technicians for bringing up and configuring the camera modules individually. As opposed to maximizing the utility of each camera by planning and calibrating individual fields of view, the system and method can address calibration by "saturating" an area with cameras and autonomously detecting the camera topology within the environment. The system can be used in creating a high-density imaging system within an environment. In this way a worker installing a camera module can be alleviated of worrying about the exact orientation and positioning of the cameras.

As a related potential benefit, the system and method can additionally have easer maintenance. Various potential implementations of the system and method can address various scenarios to simplify responding to system issues and/or updating the system. In some variations, component redundancy designed into the camera modules can allow the monitoring network to be resilient to individual failures by failing over to redundant data and/or power systems. This can increase uptime of the system. In another variation, an installed camera module (e.g., a camera module not functioning properly or an old version of a camera module) can be replaced by a new camera module 200. Such camera module updates can be performed without having downtime on other camera modules.

As another potential benefit, the system and method can enable efficient configuration of camera compute modules. In one variation, fields of view for a series of cameras can be coordinated such that they efficiently cover a shelf, aisle, or other region of interest in a manner preconfigured through the arrangement and orientation of the cameras in the camera modules. In some variations, this may enable the number of cameras for an install to be significantly reduced. Additionally, some embodiments of the system and method can utilize commodity imaging components to provide an economical solution to outfitting an environment. The system and method can be operational using cheaper and more commodity components such as small format camera sensors (e.g., camera with a camera sensor sized: ¼ in., 1/3.2 in., ⅓ in., 1/1.7 in., and/or other sizes).

As another potential benefit, the system and method can be a visually unobtrusive. With minimizing cabling and complex component installations, the system may blend into the environment as a standard infrastructure system that can go mostly unnoticed to people in the environment.

As another potential benefit, some embodiments may leverage CV-based processing to address bandwidth data storage limitations. CV-based processing can enhance information retention through dynamic information processing that involves CV-based metadata extraction, media processing, and tiered storage solutions.

2. System

As shown in FIG. 1, a system for outfitting an environment with ubiquitous video monitoring of a preferred embodiment can include a monitoring network 100 comprised of a set of camera modules 200 mounted and interconnected within an environment. Each camera module 200 of the set of camera modules preferably includes at least one camera 220 and at least two connection ports 230. Within the monitoring network, the set of camera modules (or at least a subset of camera modules) serially connect through the connection ports 230, wherein a physical connection is established between connection ports 230 of network adjacent camera modules. In this manner, the system can be used to form a connected chain of camera modules 200 with shared network and/or power connections.

The system preferably enhances feasibility of implementing a ubiquitous video monitoring system. The system includes various factors that benefit the ease of installation as well as the reliable monitoring of the environment for serving a CV-driven application. Some variations may include multiple cameras mounted in pre-configured arrangements in an enclosure, component and connection redundancy, hotswap capabilities, corrective optical systems, and/or other features. As discussed, the system is preferably used for CV-driven applications like automatic checkout but can be used for other types of applications.

Preferably, the camera modules are devices that include multiple connection ports 230 for receiving power and/or network connectivity and relaying power and/or network connectivity to connected camera modules 200. Camera modules 200 can be chained together by connecting with one or more cables that provide data and/or power transport between the camera modules 200. In one preferred implementation, the camera modules 200 have an enclosure body 210 with an extended length profile that has connection ports 230 on opposing ends of the camera module 200 (e.g., a first connection port 220 on a first side and a second connection port 220 on a second side opposite the first side). The elongated length profile functions to promote easier installation of cameras in a pre-configured arrangement along a path (e.g., down an aisle in a grocery store). In one preferred embodiment, the camera modules 200 are suspended fixtures interconnected by ethernet or PoE cables. The camera modules 200 can contain one or more cameras 220 and possibly a set of computational components to facilitate local processing of media. In some cases, CV-based processing can be performed locally to mitigate the amount of media that is communicated across the monitoring network.

In some variations, the camera modules can include redundant data and/or power connections for network resiliency. If a power connection fails, a redundant power connection can keep the camera module 200 powered. Similarly, redundant network connections can maintain network connectivity if one connection encounters an issue. Additionally, in some variations, a camera module 200 can include a hotswap control system for removal and reinstallation of a camera module 200 such that camera modules 200 can be changed while the system maintains operation.

Monitoring Network

The monitoring network 100 functions to coordinate the collection of video media data from across a number of camera modules 200 that are connected as a camera module network. A CV-driven application will generally operate from data collected from one or more monitoring networks 100. Within an environment there may be a number of monitoring networks 100 (i.e., sub-networks). The camera modules 200 may be connected in series within the monitoring network 100. The camera modules 200 may alternatively include branches in the monitoring network 100. In one variation, the monitoring network 100 can be comprised of just video camera modules. In another variation, the monitoring network 100 may additionally include nodes comprised of other types of sensor modules/devices.

Figure 2:
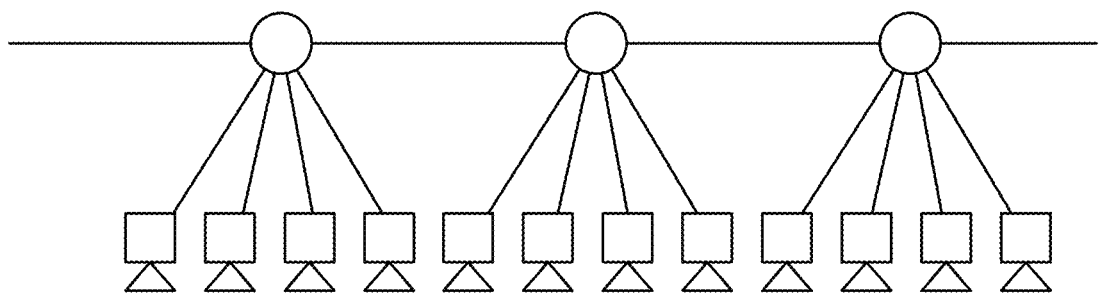
FIG. 2 is a network diagram representation of a series of camera modules.

There are a number of different ways to effectively configure the monitoring network 100 of such a system. In one preferred configuration, a monitoring network 100 within an environment is comprised of a set of sub-networks formed by a serial connection of a set of camera modules 200. A serially connected monitoring network (i.e., a daisy-chain network configuration) preferably has each camera module 200 connected to at least one other camera module 200 such that the string of camera modules forms a chain. As shown in FIG. 2, from a network perspective, the series of camera modules may be the series connection of multiple network nodes each having a number of camera connections.

Figure 3:
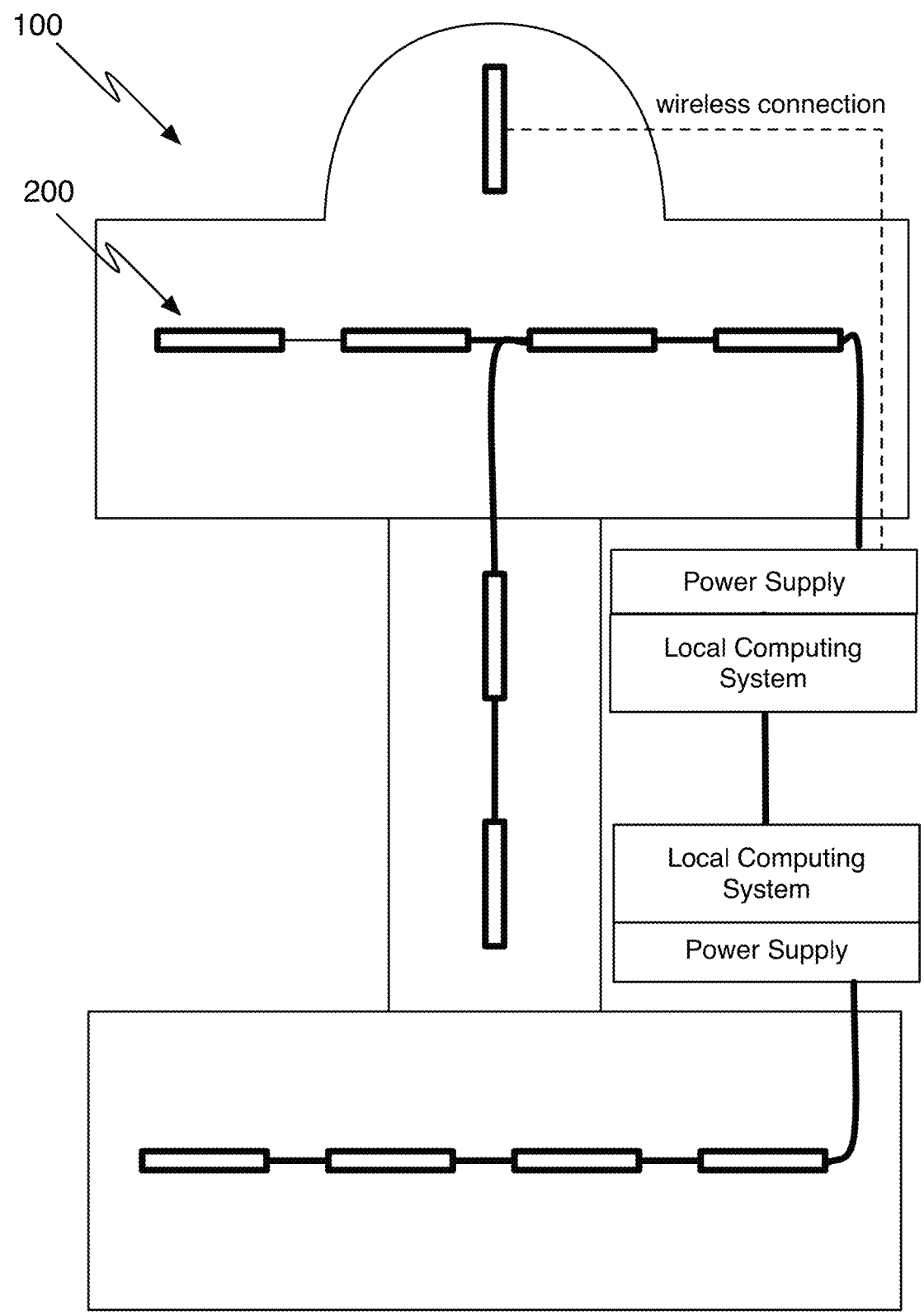
FIG. 3 is a schematic representation of an instantiation of the system.

In general, a first end (and/or terminal end) of the chain can include connections back to the rest of the system. A configuration could additionally include interconnection branches. For example, a daisy-chain of camera modules could split at some point so that there are two or more branches. The number of camera modules included in a serial connection can be any suitable number. The number of camera rails in series could be just two, but more generally will be more than ten and could be any suitable number (e.g., 40 camera modules, 100 camera modules, 1000 or more camera modules, or even more). As shown in FIG. 3, the set of serial sub-networks may all be connected back to one or more points for centralized compute and/or power supply.

In another configuration, the monitoring network 100 can be a star pattern, such that each camera module 200 is connected to a single, central component. The central component could be a primary camera module 200 (e.g., a hub camera module), but could alternatively be an alternative central component interfacing with the different camera modules.

Still another configuration is a loop or ring that is connected at two or more ends. A combination of one or more of the above or alternative topologies is also possible.

The system may additionally be compatible with external cameras, imaging devices, other suitable sensor units, and/or output systems. In one variation, camera modules 200 may additionally include compatibility to facilitate a connection with an external camera such as an IP camera. An external camera connection may alternatively be achieved through an alternative channel such as through an external camera interface on a local computing system. In one implementation, an external camera module 200 can include similar operative components of a camera module 200 but collects an external video stream of an external imaging system instead of a video stream from an internal camera. The enclosure body 210 and form factor may be altered to accommodate interfacing with a variety of camera types. In this way, existing cameras and surveillance systems can be retrofitted to integrate with the monitoring network 100 and the system.

The monitoring network 100 is preferably installed in a distributed manner across an environment. The system is preferably adaptable for customizing the video monitoring so that focus is appropriately directed at subjects of interest. In many exemplary shopping environments, the subjects of interest include the products as they are stored and displayed in the store and areas where customers, workers, or other agents interact. As discussed herein, various approaches may be applied in installing and configuring the camera modules 200 of the monitoring network 100. A monitoring network 100 may employ a variety of such configuration variations to address different monitoring scenarios in the environment.

Camera Module

The camera module 200 of a preferred embodiment functions as an imaging device that is positioned within an environment. The camera module 200 can function as one unit of the building blocks of the system in constructing and laying out a monitoring network 100. A monitoring network 100 is preferably comprised of a set of camera modules 200 that cooperatively act to monitor and collect data from across the environment. More particularly, a monitoring network 100 can be one or more sets of physically interconnected camera modules 200. A camera module 200 preferably includes at least an enclosure body 210, one camera 220, and a set of connection ports 230. The camera module 200 preferably facilitates image monitoring, but additionally facilitates fixturing/mounting, network configuration, system integration, CV-based processing and data management, and/or or other suitable aspects.

In at least one variation of the camera module 200, the enclosure body 210 has an extended length profile, and the camera module 200 is configured with mounting mechanisms to be suspended horizontally from a ceiling or elevated structure. There is preferably a plurality of camera modules 200 used for any suitable instantiation of the system.

The camera modules 200 of a monitoring network 100 may be of a uniform type and form, but a set of different camera module types can similarly be used. In some cases, as part of a building block of the system, there is preferably a set of camera module types that can be used to address different challenges when installing in an environment. Functionality and internal elements such as the cameras and/or computational components are preferably substantially similar across different camera module types, but the enclosure body 210 may be customized to accommodate different uses. In one implementation, the camera module types may include different form factor variations and/or capability variations.

The different form factors can accommodate different applications and scenarios where different shapes and/or sizes are more applicable. Some exemplary different camera module form factor types can include suspended camera modules, mounted camera modules, flexible camera module strips, single-point camera modules, and/or any suitable type of camera module 200. Additionally, there may be different sizes or shape variations of each of these.

Capability variations may enable different capabilities to be enabled and integrated at different portions of the monitoring network 100. Capability variations can include cameras with varying arrangement, orientations, camera counts, camera angle configurations, camera optical systems, enclosure body sizes and form factors, processing capabilities, and/or other suitable variations of a camera module 200. Camera module types can have varieties in terms of lengths, capabilities, and/or other properties.

In one variation, capability variations can be two camera module types: a normal camera module 200 and a hub, central, master, or primary camera module 200. The primary camera module may include additional computing resources to facilitate processing data of the system. As the additional computing resources may be needed in limited supply and contribute to cost, they may be provided as specialized camera modules that can be used as needed in a monitoring network.

The camera modules 200 are preferably interconnected by wired conductive connections that interface with the camera modules 200 through at least one of the connection ports 230. The connection ports 230 can connect power and/or a data connection (e.g., network connectivity). Wireless communication may alternatively be used for one or both of power and/or data connectivity. In one example, multiple sub-networks of camera modules can be integrated as shown in FIGS. 1 and 3.

Additionally, to facilitate easy configuration, camera modules 200 may be designed with redundant or optional components that can be enabled for different monitoring network 100 configurations. For example, while wired networking is preferably used. The camera modules may additionally include a Wi-Fi module or other wireless communication module so that a camera module 200 or a subnetwork of camera modules could communicate wirelessly with the system. Wireless power delivery may additionally or alternatively be used.

A camera module 200 preferably includes at least two connection ports 230 such that the camera modules may be connected in series. With an enclosure body 210 with an elongated form a first connection port 230 can be positioned on one end and the second connection port 230 can be positioned on the other end. The connection ports 230 may alternatively be positioned in any suitable arrangement (e.g., side-by-side). Some variations can include three or more connection ports such that a monitoring network 100 can include multiple branches. For example, one end of a camera module 200 can include two connection ports 230 such that a series of camera modules 210 can branch or merge at that end of the camera module 200.

As discussed, the camera modules 200 are part of a modular set of components available through the system, which can be used in customizing configuration and arrangement of the camera modules 200 to be customized to a particular environment and/or use case. Different environments and use cases can have different requirements. Environments may have various static or changing visibility expectations that can impact the spacing and arrangement of camera modules. Similarly, the use case or objective of the system can have a similar impact on arrangement. For example, when used in a store or a warehouse, the layout of inventory and shelving can be a factor when configuring camera modules. As another example, using the system for detailed inventory and customer interactions may have different coverage requirements.

In particular for some variations, the system can be used for monitoring items on the shelves and interactions with those items. The installation configuration of one or more camera modules within the monitoring network can be designed to specifically address challenges of monitoring inventory and inventory interactions. In some cases, the camera module 200 design and features may be customized for specific installation plans.

Figure 4A:
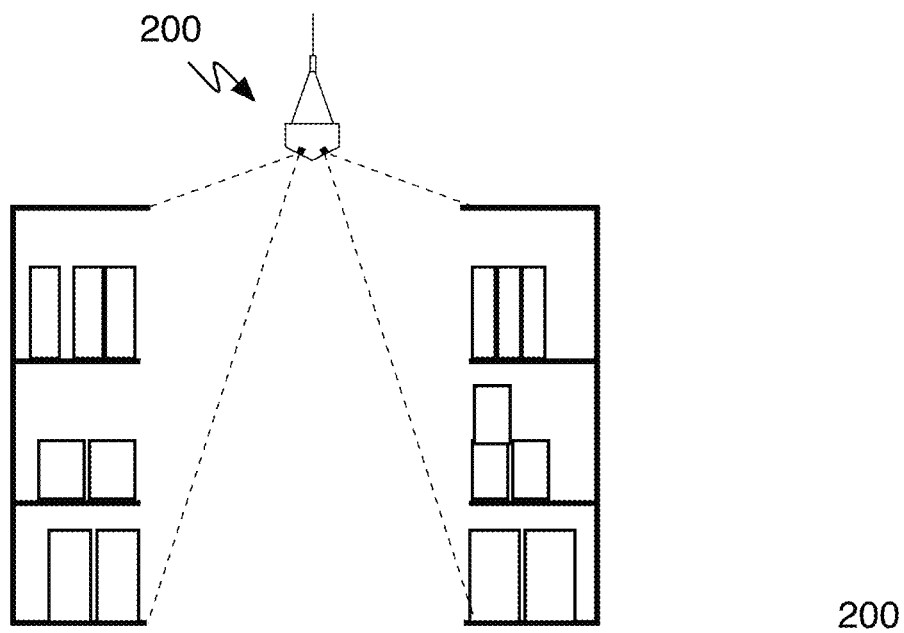
FIGS. 4A and 4B are schematic representation of exemplary configurations of a suspended camera module.
Figure 4B:
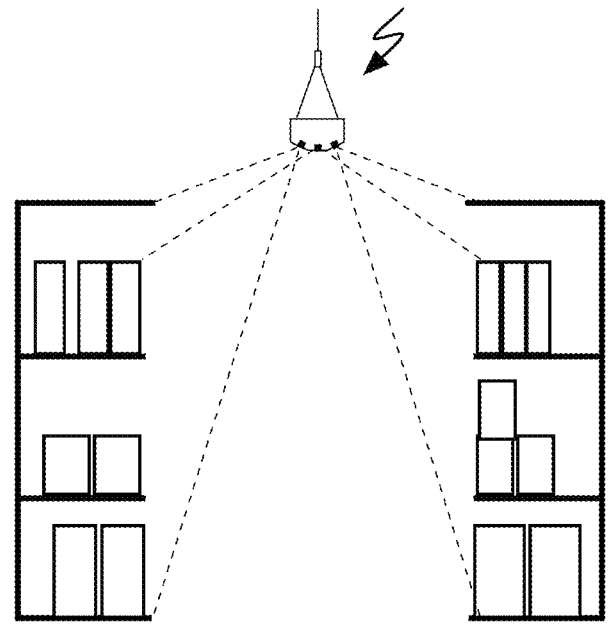

As shown in FIGS. 4A and 4B, a dual-angled center camera module 200 can be positioned in the upper region or above the center region of an aisle to monitor both sides of the aisle. Some stores have existing infrastructure for suspending lights down the middle of aisles. In some variations of the camera module 200, a camera module 200 with lighting fixture integration could be used so that a) the camera modules may be mounted to existing infrastructure by replacing existing lighting fixtures, and/or b) the system can provide lighting to the environment in those regions.

Figure 5:
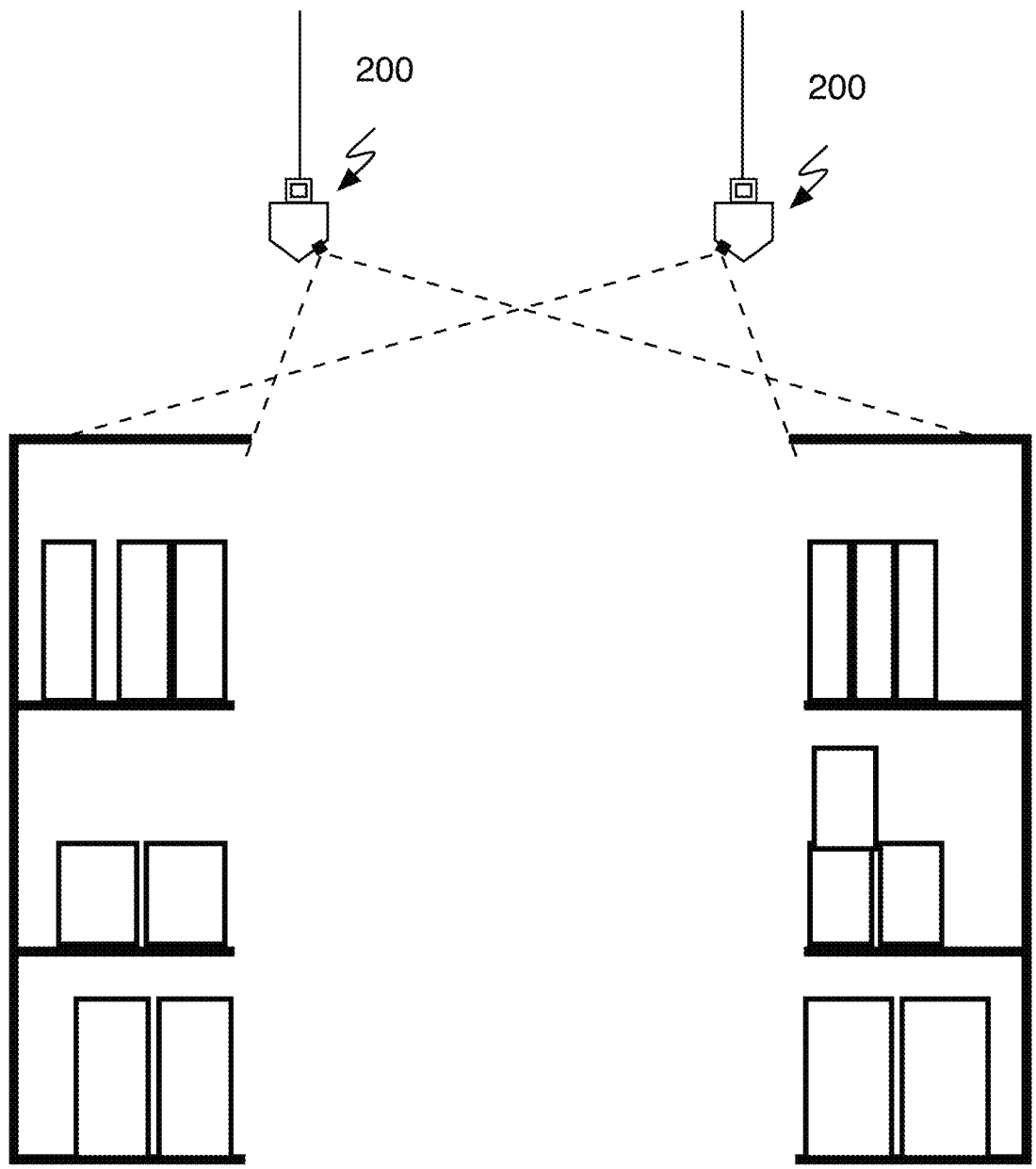
FIG. 5 is a schematic representation of an exemplary configuration of two rows of camera modules aligned within a shelving aisle.

As shown in FIG. 5, another installation configuration could have at least two rows of connected camera modules running down either side of an aisle in a store. In this variation, installing the camera modules 200 above and preferably in front of the face of a shelf (e.g., 5 inches to 10 inches in front of a shelf face) may enable the camera module 200 to both monitor items on the shelf opposite the aisle and monitor when and approximately where customers interact with the shelf face closest to the camera module 200. In one implementation, a single camera can have a field of view incident on a first shelf face and the opposite edge of the field of view incident on the upper region of the opposite shelf face as shown in FIG. 5. In another implementation, a dual-angle camera module 200 may have one camera directed substantially in a first orientation (e.g., downward) where a first shelf face is within the field of view and a second camera directed in a second orientation (e.g., outward diagonally) where the second/opposite shelf face is within the field of view of the second camera.

Figure 6:
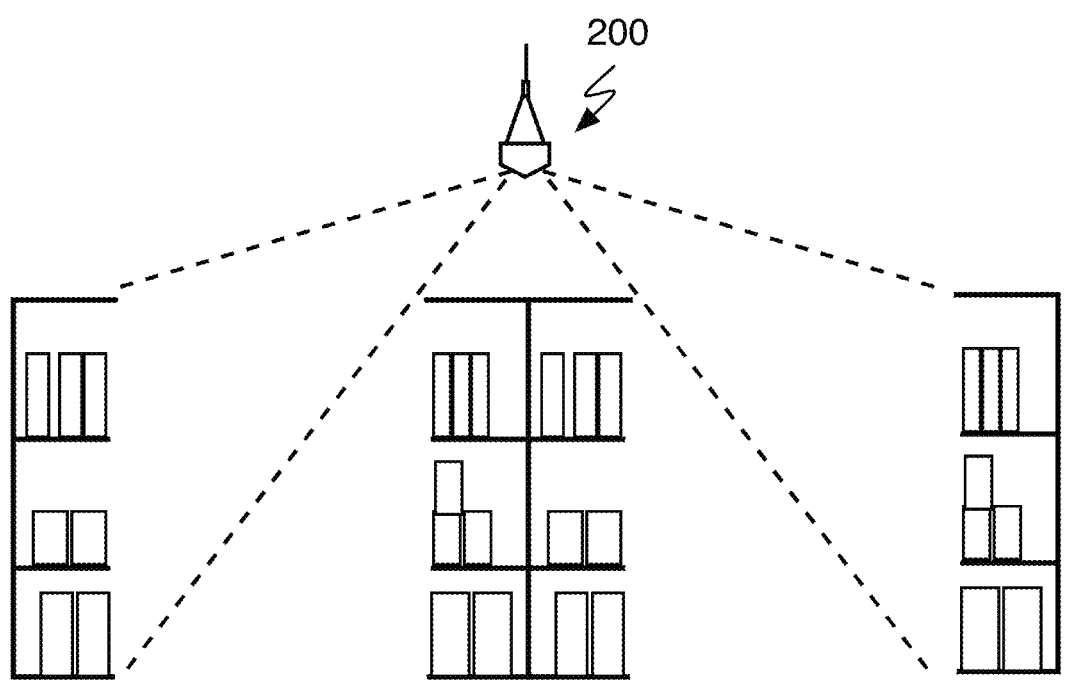
FIG. 6 is a schematic representation of an exemplary configuration of a suspended camera module.

Other installation configurations may also be used. In some variations, the camera modules may be installed so that they run perpendicular to a shelf face or a target region. In another variation, the camera modules may be installed so that the camera module 200 collects image data spanning multiple aisles as shown in FIG. 6.

Camera Module Body

The enclosure body 210 of a preferred embodiment functions as a frame for mounting the cameras 220, mounting and protecting computational components of the camera module 200, and/or housing other elements of the camera module 200. The structural body is preferably a solid encasement that contains the computing components. The enclosure body 210 can include a structural body with at least one defined camera mount. A preferred variation of camera module 200 can include a plurality of cameras 220 wherein the plurality of cameras 220 are mounted with a spaced arrangement across the enclosure body 210 in different defined camera mounts. The enclosure body 210 can additionally include one or more mounting mechanisms that function to facilitate positioning, fixturing, or otherwise physically coupling the camera module 200 in place.

The structural body is preferably enclosed, but alternative form factors such as an open tray could also be used. The structural body can be made of any suitable material such as plastic, aluminum, steel, a composite, or any suitable material. In one preferred implementation, the structural body is fiberglass, which could minimize signal interference. A structural body can be a single piece design, but the structural body can alternatively include multiple interconnecting components.

The structural body is preferably a static element with one or more defined cavities for holding the camera and computational components. Preferably, the camera modules 200 support "daisy chaining" or "stringing" camera modules across an environment. Different form factors of the structural body can be used to accommodate installation in different types of sites. Two preferred variations include a rail structural body, tile structured body, and/or a compact structural body.

Figure 7:
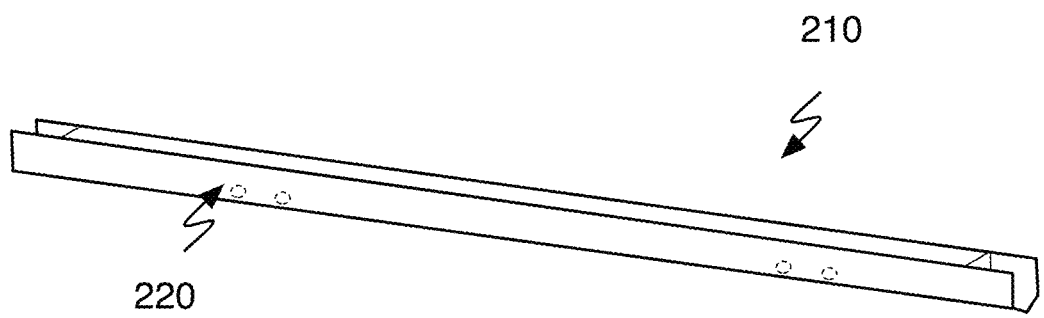
FIG. 7 is a schematic representation of an exemplary camera module rail enclosure body.
Figure 8:
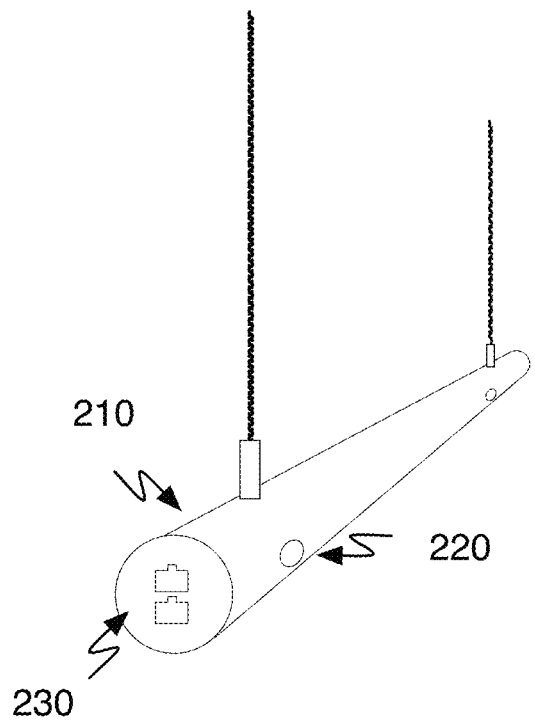
FIG. 8 is a schematic representation of a suspended camera module.

In a rail structural body variation, the structural body has extended length profile, wherein the magnitude along one dimension of the structural body is significantly greater than the other two dimensions (e.g., the length is significantly greater than the width or depth). Described another way, an enclosure body 210 can have a rail-shaped as shown in FIG. 7, tube-shaped enclosure as shown in FIG. 8, or any suitable shape. The shape is preferably straight but curved, arced, or angled enclosures could additionally have an extended length profile. An elongated form factor may function to facilitate arranging cameras along a long run in the environment. For example, for a given length of space, an elongated form factor can have a lower number of units-per-length that need installation thereby reducing labor for installation.

A rail structural body variation can come in different lengths. Some exemplary lengths may include lengths that are somewhere between 3-10 feet. In some instances, a set of different lengths may be used: a 2-3 foot enclosure body, a 5-6 foot enclosure body, and a 9-12 foot enclosure body. Any suitable length may alternatively be used.

Figure 9A:
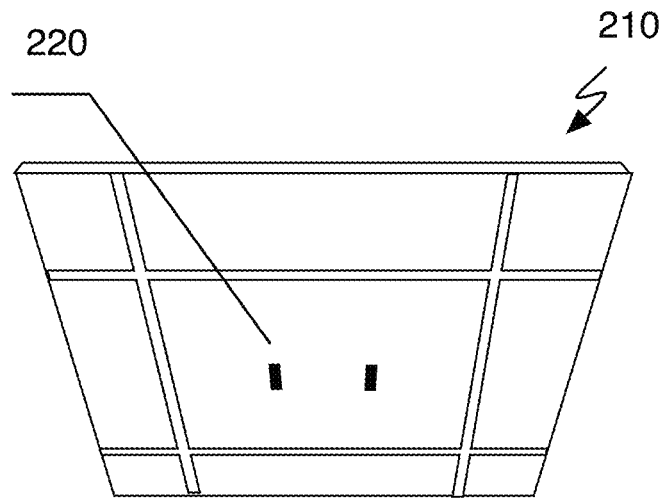
FIG. 9A is a bottom schematic view of a camera module body compatible with ceiling tiles.
Figure 9B:
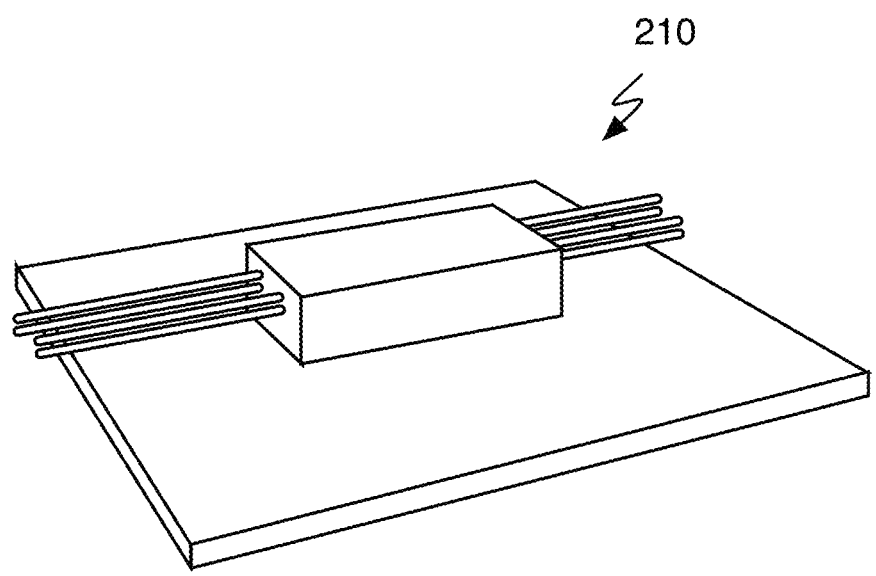
FIG. 9B is a top schematic view of a camera module body usable within a ceiling tile structural system.

In a tile structural body variation, the structural body may be designed for distributing camera modules 200 by "tiling" or "spreading" camera modules as shown in FIG. 9A. A tile structural body can be an enclosure body with a form factor that has at least one substantially planar face and as such can be a plate or sheet. The planar face will generally be in the shape of a square or rectangle but any suitable shape may be used. The planar face preferably is used to expose the cameras while the opposite side is preferably used to expose connector ports and optionally house the components of the camera module. A structural body variation may function to make the camera modules 200 compatible with ceiling tile infrastructure as shown in FIGS. 9A and 9B. The camera modules can be installed by replacing existing ceiling tiles with a tile variation of the camera module (i.e., a camera module tile). A camera module tile can have a structural surface shaped two feet by two feet, two feet by four feet, or have any suitable ceiling tile compatible size. The camera module tiles are preferably compatible for drop in installation to t-bar or suspended ceiling fixtures used for drop ceilings as shown in FIG. 9A. In a related variation, the structural body can be designed for adding on to or retrofitting an existing ceiling tile or material. In this variation, the camera module may be designed such that the cameras 220 project through the ceiling tile or material such that the cameras view the target region. Some or all housing of camera module components may be designed to be positioned above the ceiling tile out of site as shown in 9B.

Figure 10:
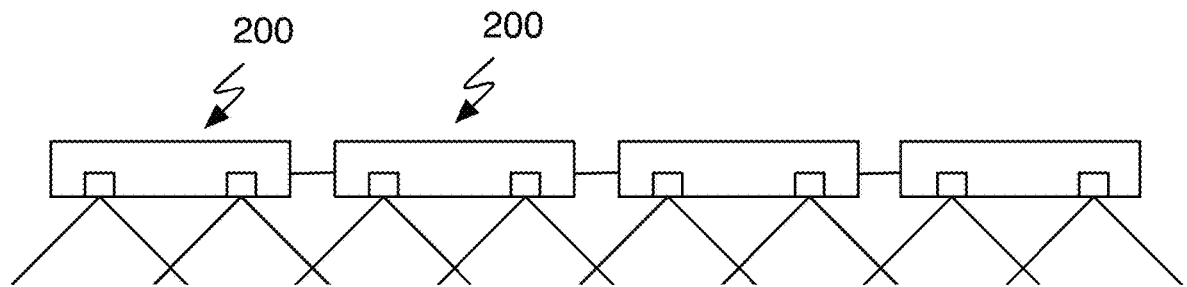
FIG. 10 is a schematic representation of camera and camera module spacing.

The rail structural body variation and the tile structural body variation the camera modules may be positioned in a regular fashion wherein the arrangement of the cameras can be substantially periodic and regular across multiple interconnected camera modules. As shown in FIG. 10, a five and half foot camera module rail could be interconnected with six inch spacing between camera module rails such that pairs of cameras in the monitoring network have three foot spacing.

Figure 11:
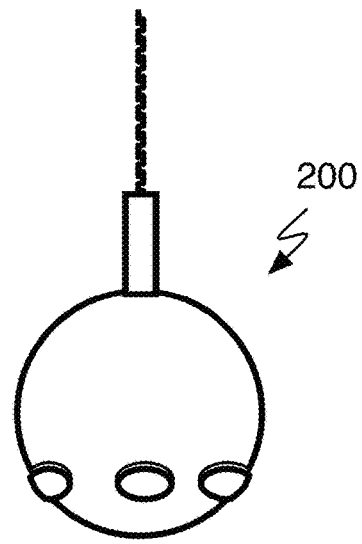
FIG. 11 is a schematic representation of an exemplary single-point camera module.

In a single-point camera module, the structural body may be designed to be compact such that the camera modules 200 can be installed at distinct points. The single-point camera module may include a single camera mount but more preferably will include multiple camera mounts directed in different directions as shown in FIG. 11. In one implementation, a single-point camera module can be a suspended camera module 200. However, the mounting mechanism of the single-point camera module can be any suitable mechanism to fasten or position the camera module 200. A single-point camera module may include the variations described herein such that it can connect to one or more camera modules through a wired connection. However, a single-point camera module in particular may alternatively make use of a wireless communication channel such that only power is delivered through a wired connection. A single-point body may be designed for more point-based installations where the interconnections of camera modules are not substantially interconnected in close proximity as in FIG. 10.

Herein, the rail structural body variation is primarily used as an example but any suitable variation could alternatively be used.

The varying form factors may be mounted in various manners within the environment. An enclosure mounting mechanism is preferably a fastener mechanism or design feature of the enclosure body 210 that promotes positioning, attaching, or otherwise physically coupling a camera module 200 to an outside structure. The nature of the mounting mechanism can vary depending on the camera module type. Selected variations are described more below.

As shown in FIG. 8, a suspended camera module 200 is a form factor that is configured to be suspended from a higher structure such as a ceiling. A suspended camera module 200 is preferably used in monitoring an environment from the ceiling region, and it may be straightforward solution for commercial spaces that already leverage suspended fixtures such as lights and signage.

The mounting mechanism of a suspended camera module 200 preferably accommodates one or more cable connection points. In one implementation, the enclosure body 210 can include two threaded lamp tube fastening points along the length of the enclosure body 210 and on opposing sides such that two cables can be used to horizontally suspend the camera module 200 from the ceiling. In another exemplary implementation, a mounting mechanism (e.g., protruding bolts) may be designed for mounting to a supplementary structural element like a unistrut or cable fixturing mechanism.

Figure 12:
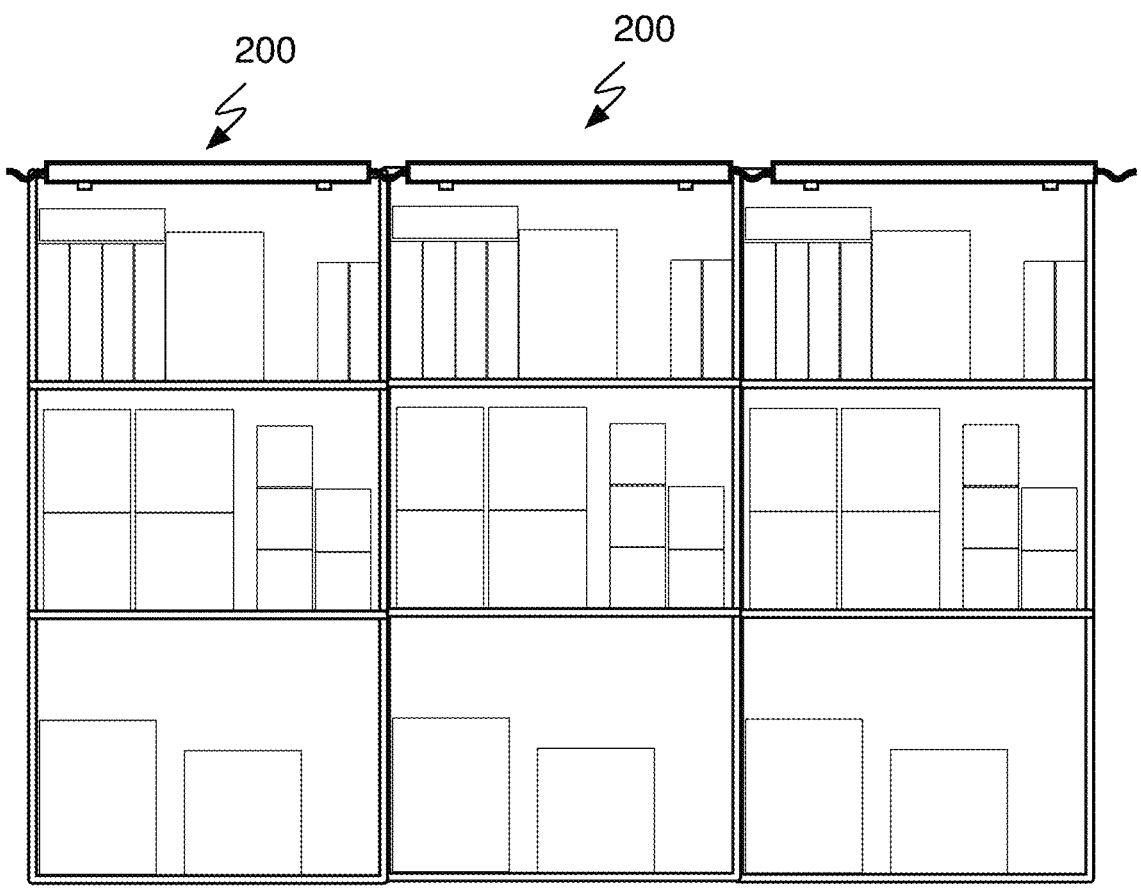
FIG. 12 is a schematic representation of mounted camera modules.

In another variation, a mounted camera module 200 is preferably configured to be rigidly fastened or attached to another rigid structure. For example, camera modules may be mounted directly to a shelf as shown in FIG. 12 so as to horizontally extend across an aisle of adjacent shelves. The mounted camera module 200 can include many of the suspended camera mount design considerations. However, as a mounted camera module 200 may be in closer proximity to users, mounted camera modules preferably include design considerations to more rigorously protect from tampering and abuse. The mounting mechanism can be defined to include bolt through-holes so that the mounted camera module 200 can be securely fastened to another structure. With similar robustness considerations, a mounted camera module 200 may additionally include a protective camera cover so that wear-and-tear near the camera mount areas can be addressed by replacing the camera cover as opposed to changing the camera module 200 or the camera.

Figure 13:
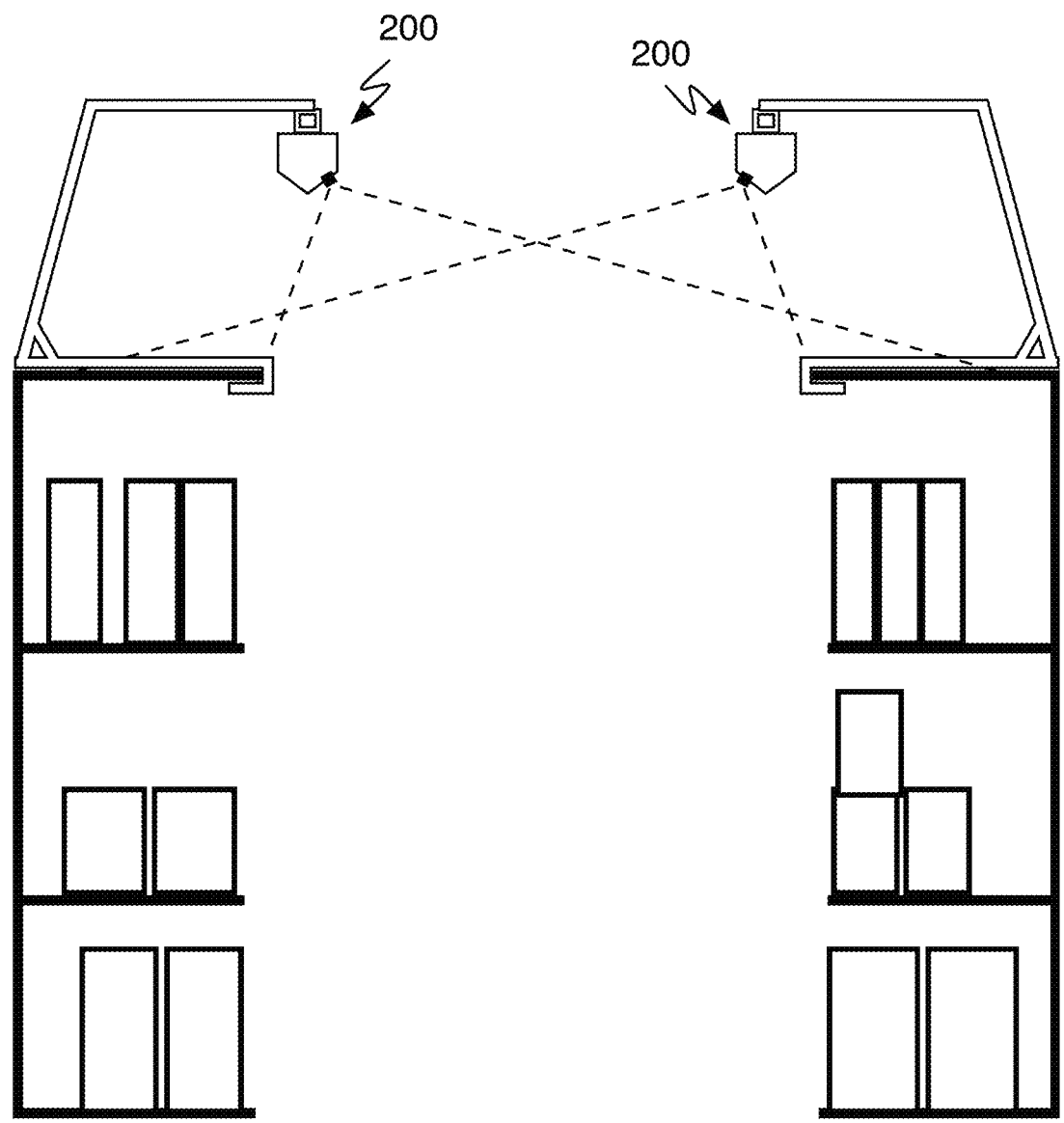
FIG. 13 is a schematic representation of an alternative mounting system for camera modules.

In another variation, the system may include a bracing structure that acts a rigid structure to suspend or otherwise position a mounted camera module 200. As shown in FIG. 13, a shelf-adapter structure may attach to the top shelf of a shelving unit and suspend a lever outward to a correct mounting position. This may function to simplify installation along aisles and to promote controlled positioning of a camera module 200 relative to the shelf face.

The camera mounts function as locations where a camera is mounted.

In one variation, the camera mounts can be defined cavities or recesses of the structural body such that cameras can have an outward view of the environment. In one variation, the camera mounts may additionally facilitate connected camera units such that in place of fixed cameras, interchangeable camera units can be connected or plugged into a port accessible through the camera mount and held in the camera mount. Interchangeable camera units may enable camera customization and upgrades. The camera mounts may be statically positioned. Alternatively, the camera mounts may be repositioned either through physical manipulation or through a controlled camera actuator system. The customization of camera angle when mounted may be through an articulated mechanism (e.g., cameras can be moved into position) or through a static fixturing approach (e.g., cameras are mounted in one of a range of possible positions.) In one exemplary implementation, a segment of the enclosure body 210 with extended length profile can include a camera mount section that can be rotated about the central axis of the enclosure body 210 to rotate the angle of the camera. In another implementation, camera angle may be customized during final assembly of the camera module 200.

Camera Module Variations

In one variation, a camera module 200 may include multiple sub-assemblies that can be connected to form a complete camera module 200. In one example, a suspended camera module 200 may be formed by connecting two partial camera module halves through a mechanical and wired connector. Each camera module unit may include the necessary components. Alternatively, some camera modules may omit or contain particular components such that camera module units may require being connected in a combination such that particular component requirements are fulfilled. For example, a special processing camera module unit may be required to be connected to any segment of a camera module assembly for every six active cameras.

Figure 14A:
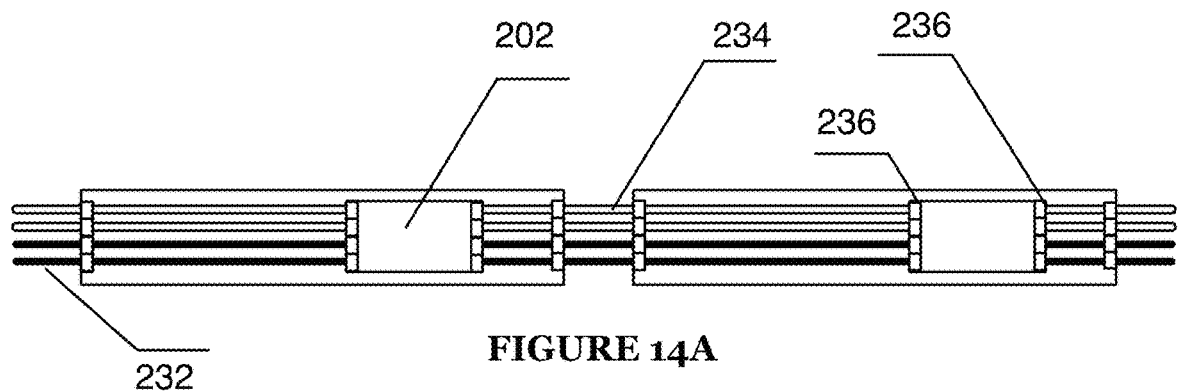
FIGS. 14A and 14B are schematic representation of camera modules, redundant power and network connectivity, and modular use of camera sub-system units.
Figure 14B:
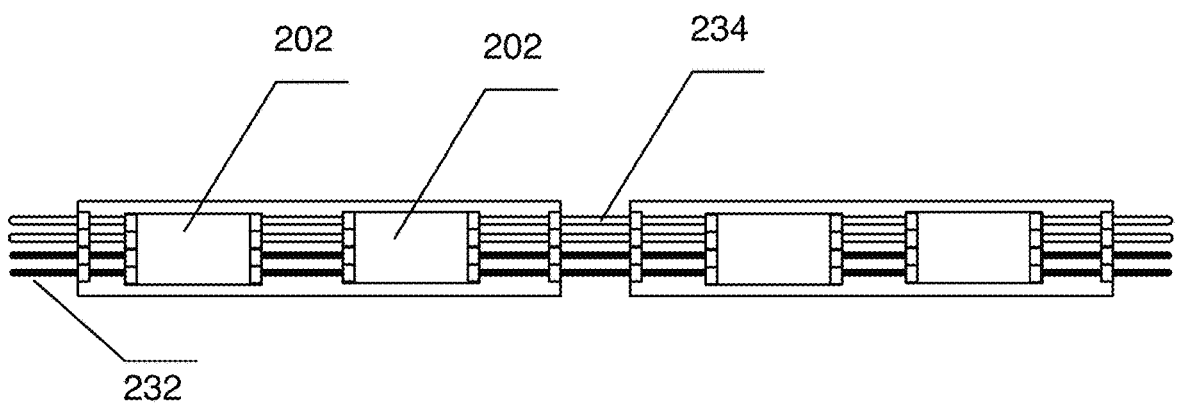

As another modular variation, each camera module 200 may include connectors on one or both ends such that any suitable number of camera sub-system units 202 (i.e., camera module units) can be combined to form a camera module assembly. A camera sub-system unit 202 is preferably a computing device such as a PCB board or enclosed computing device. A structural body can have internal fixtures to mount varying numbers of camera sub-system units 202 as shown in FIGS. 14A and 14B. In the example of FIGS. 14A and 14B, the different sub-system units 202 each support some number of cameras and thus the number of cameras in a camera module 200 can be adjusted by selecting the number of enclosed subsystem units 202. In this way, camera modules may be flexibly customized and repurposed for different environment challenges.

Figure 15A:
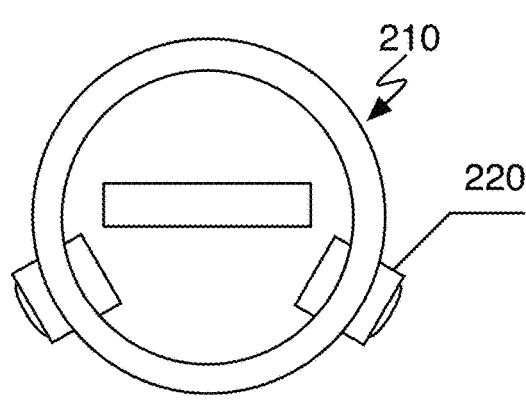
FIGS. 15A-15E are exemplary cross sectional profiles of camera modules.
Figure 15B:
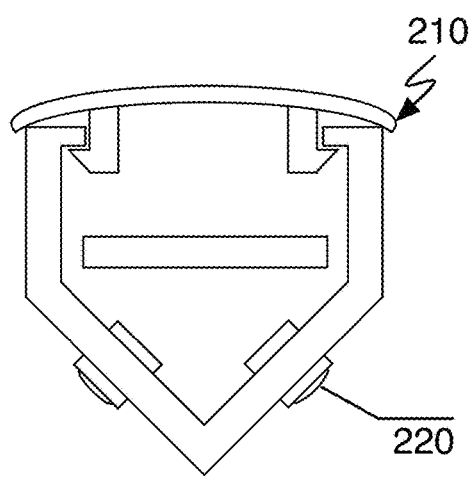
Figure 15C:
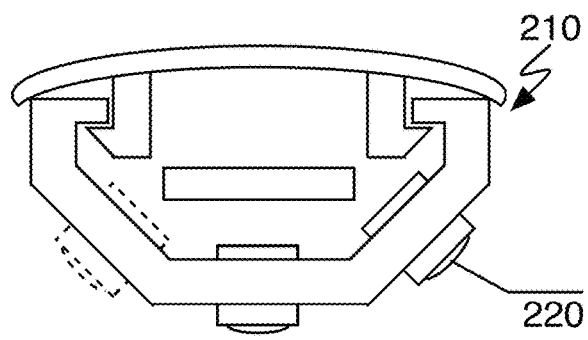
Figure 15D:
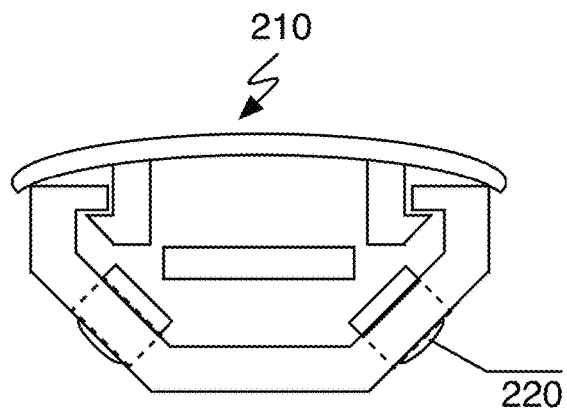
Figure 15E:
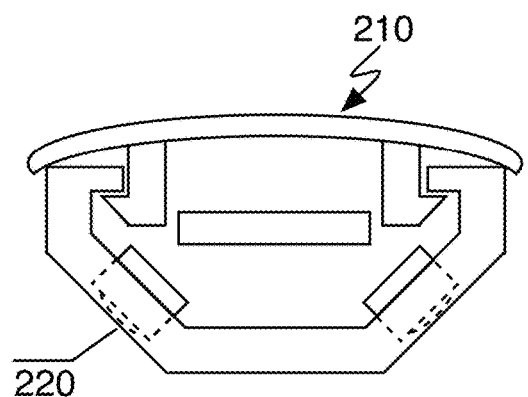

For structural stability, the structural body can be a substantially rigid material such as steel, fiberglass, aluminum or plastic, but any suitable material may be used. In one variation, the enclosure body 210 can be a length of tubing, bar, or other form of self-contained rail as shown in FIG. 15A, but may alternatively be an open trough. Computational components are preferably contained within a defined recess or hole of the enclosure body 210. The cross section of the structural body preferably includes subsections or structures that extend upward, which functions to act as containing walls and to provide structural support during suspension. As shown in FIGS. 15A-15E, various profiles may be used. A trough design may additionally include a cover component to at least temporarily seal contained components within the enclosure body 210 as shown in FIGS. 15B and 15C. Downward facing walls of the structural body can be angled so as to position cameras at an intended angle. In one implementation, a right angled extruded bar can have camera mounts oriented on each face so as to monitor different directions as shown in FIG. 15B. In one variation, the angle may be adjustable. In one variation, the structural body may have a section with multiple facets and/or camera mount options as shown in FIG. 15C so that positioning of the camera can be selected during manufacturing and/or installation. The cameras may be mounted 'proud' as shown in FIG. 15D, or recessed slightly as shown in FIG. 15E so that they are mechanically protected while still having a full optical view of their surroundings.

Figure 16:
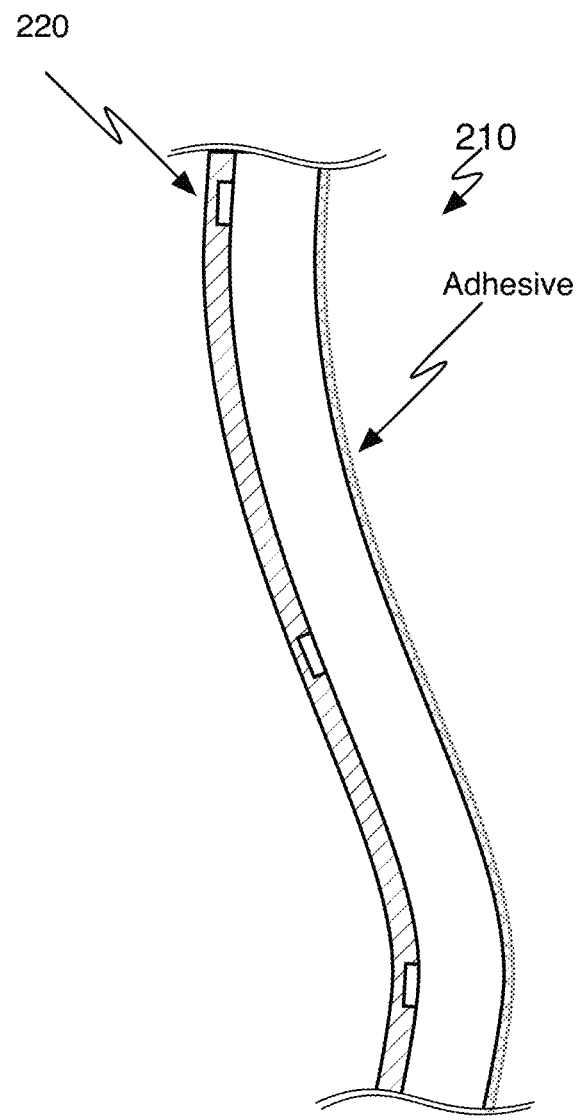
FIG. 16 is a schematic representation of a flexible camera module.

As one alternative variation, a flexible camera module strip can facilitate a camera module 200 being adhered or otherwise attached to a surface. As opposed to a structural body made of a rigid material, the structural body of flexible camera module strip can be bendable along substantial portions of its geometry as shown in FIG. 16. Some portions may still be made rigid to protect rigid internal components. In one preferred embodiment, the flexible camera module strip includes an adhesive backing opposite the side of the camera mounts such that the flexible camera module strip can be installed by simply applying it to a surface.

Cameras

The cameras 220 of a preferred embodiment function to collect image data. The image data is preferably a video stream but could alternatively be periodically collected photographs. The video stream may or may not include audio recorded by a microphone. The cameras 220 may alternatively be used to collect other forms of image data. A camera 220 of the system may collect any suitable combination of visual, infrared, depth-based, lidar, radar, sonar, or other types of imagery.

The set of cameras used within the system or a single camera module can have varying resolutions, fields of view, aperture settings, frame rates, capabilities, or other features. The cameras 220 are preferably statically mounted in a camera mount of a camera module 200. Alternatively, the cameras 220 and/or other camera mounts may be actuated such that a camera can be redirected during use.

An individual camera module 200 preferably includes at least one camera 220, but may alternatively include multiple cameras 220. Multiple cameras 220 may be mounted at different locations on a camera module 200. The cameras 220 can be mounted to have distinct positions and/or directions such that the cameras 220 have a configured arrangement where the arrangement characterizes spacing and relative orientation. Preferably, multiple cameras 220 are mounted so as to have a distinct field of view, which may be overlapping or non-overlapping with a field of view of another camera 220 in the monitoring network 100 or the camera module 200. In one implementation, multiple cameras 220 may be mounted at opposing ends of an extended length camera module 200. A subset of cameras 220 may alternatively be mounted so as to capture substantially similar fields of view but using different imaging technologies.

There can be a variety of camera module 200 types with varying configuration just based on options in selection of angular orientation as part of the camera arrangement. In a first variation, a first subset of cameras are mounted with a first angle orientation. As part of a single-angle variation, all cameras of a module may have the same angular orientation wherein the image planes that are substantially parallel. In multi angle variation, a first subset of cameras are mounted with a first angle orientation and at least a second subset of cameras are mounted with a second angle orientation. A dual angle variation will have two subsets of cameras with different angular orientations. For example, a group of cameras may be directed in one direction and another group directed in a second direction as shown in the exemplary application of FIG. 4A. A Tri-angular variation may be another common variation, wherein there may be two diagonal angle orientations for two subsets of cameras and one downward facing angle orientation of a subset of cameras. Any number of angular orientations may be used.

The cameras are preferably angled so as to be directed at a target region. In one common scenario the target region is a shelf or more specifically, the shelf face. In many situations, the camera module 200 will be mounted above and in front of the shelf face. Shelves have varying heights depending on the store and type of goods. In general, the camera is mounted above the region of the shelf face of interest. The camera module may be offset from the shelf face horizontally by a few inches (e.g., five inches) to several feet (e.g., 15 feet). In general, the camera will be somewhere between three to eight feet displaced from the shelf face in a horizontal direction. The cameras will often be elevated above the top surface of the shelf with vertical offset of 0 feet (i.e., level) to 10 feet. Though the camera may below the top in some cases. In one situation, a subset of cameras of a camera module may be mounted with an angle orientation configured to capture a first shelf face In another situation, the camera may be mounted between two opposing shelf faces. The angle orientation of camera mountings is preferably configured to target the shelf faces. More specifically, a subset of the cameras are preferably mounted with an angle orientation that is configured to capture a first shelf face of a first shelf and a second shelf face of a second shelf when the camera module is mounted above and between the first and second shelves as shown in FIG. 5. The first and second shelf will generally oppose each other. In this way, a single camera can have two shelves in the field of view. The first shelf may be captured to identify products and/or detect item interactions by a customer. The second shelf may be captured for similar reasons, but may additionally be monitored so as to detect when an interaction event occurs with the shelf.

In one preferred variation, cameras 220 may be mounted as camera pairs, wherein a subset of cameras are paired in a depth perception arrangement, which functions to enable depth calculation to be performed. Depth sensing and estimation could additionally or alternatively be performed using alternative techniques including single camera depth prediction. The depth perception arrangement of camera pairs is preferably spacing between one and ten centimeters apart, but any suitable spacing may be used. Multiple camera pairs are preferably arranged along the enclosure body. For example, a six foot camera rail could have two camera pairs spaced three feet apart directed at a first orientation (referred to in this example as first-angle cameras. In a multi-angled camera variation, two additional camera pairs (referred to in this example as second-angle cameras) may each be positioned along side one of the first-angle camera pairs such that the second-angle camera pairs are similarly spaced three feet apart. The second-angle cameras are oriented with a second angle. N-angle cameras may be used.

The cameras 220 can additionally include an optical system 320 which functions to better target monitored objects. While the cameras 220 may provide general surveillance, cameras 220 in CV-driven applications may have particular benefits when customized to collecting image data of particular regions in an environment. For example, in an automatic checkout usage scenario, the suspended camera modules will preferably be able to reliably provide image data on shelved items. When the camera module 200 is suspended, the plane of the shelves will generally be askew from the field of view of the camera's 220, which could result in a keystoning distortion effect of the shelf and products. Additionally, the focus plan of a camera will generally not be parallel to the shelf and portions of the shelf may be out of focus despite focusing the camera on some region. In some instances, the degree of focus and out of focus of the items may not be an issue.

Figure 17:
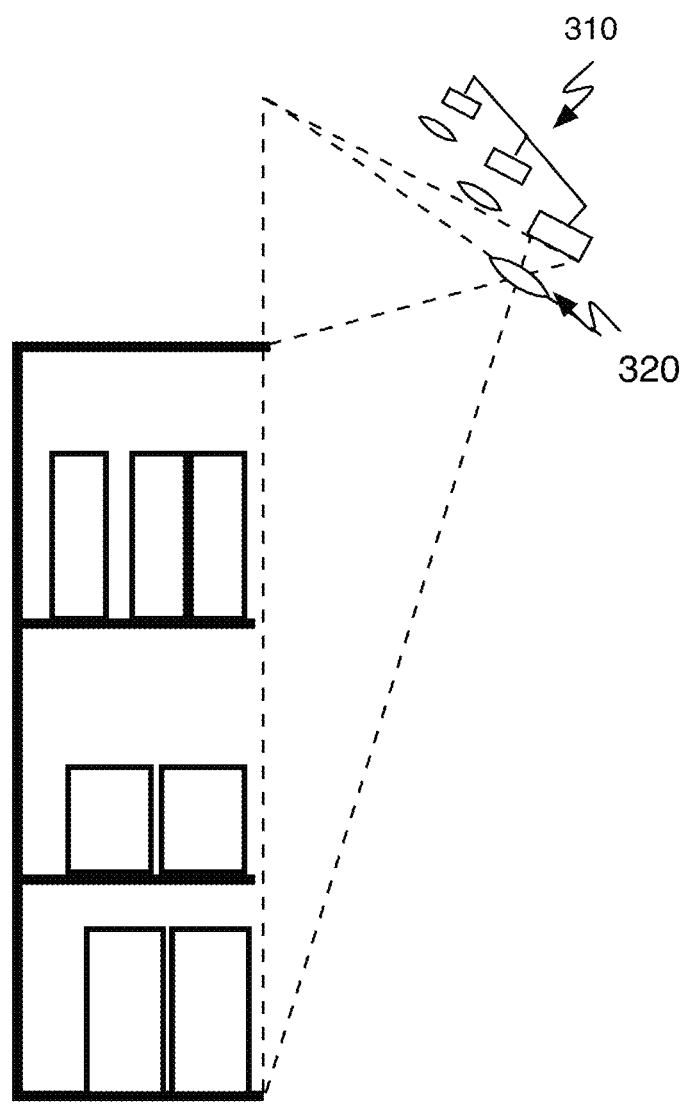
FIG. 17 is a diagram representation of a lens used in augmenting optical observation of a shelf.

A corrective optical system 320 can facilitate correcting for orientation misalignment of the camera imaging plane and a subject plane, which can mitigate distortion and/or improve focus for regions of interest. The optical system 320 preferably optically shifts and/or tilts the focus plane of a camera to counteract a portion of distortion and/or focus when imaging a target subject. CLAIM-16A corrective tilt shift (e.g., Scheimpflug) optical system can create a wedge shaped depth of field that can be aligned with the subject plane (e.g., the front plane of a shelf). In some variations, the corrective optical system may apply an optical shift, which can correct distortion. Additionally or alternatively, the optical system may apply a tilt to alter the focus plane to better align with the target region of a shelf face. This can be used to have products positioned from bottom-to-top in focus. As shown in FIG. 17, a lens can be positioned non-parallel or tilted relative to a camera imaging plane to correct imaging for shelf viewing. The FIG. 17 is not to scale so as to better illustrate the basic principles of one optional optical system. A compound lens or other optical setup can additionally be used. Additionally or alternatively other optical system variations such as a lenticular or alternative lens used for a light field camera or a plenoptic camera, use of multiple directed cameras, or other suitable cameras and/or optic systems could be used in adapting the collection of image data for a particular target.

Many variations of the optical system may be applied which is described in more detail in the section below.

Supplemental Components

A camera module 200 can additionally include other supplementary components used in offering additional or enhanced sensing or functionality. Supplementary components may include microphones, speakers, area lighting, projectors, communication modules, positioning system modules, and/or other suitable components.

In one variation, the camera module 200 can include microphones such that a distribute audio sensing array can be created. Audio sensing can be used in identifying, locating, and collecting audio input from different locations. For example, a monitoring network 100 with microphones can triangulate sounds to determine location within the environment. This can be used to facilitate CV-based tracking. This could alternatively be used in enabling audio-based interactions with the system. In one variation, the microphone array provided through the monitoring network may be used to facilitate in-store audio-interfaces. For example, a customer could issue audio commands from any place in the store, this could be synchronized with the CV-driven application which may be used to associate a detected audio command with a user entity or account issuing that command. In one implementation, the microphone array may be used in differentially locating, processing, modifying, and responding to audio sources as discussed in published U.S. patent application Ser. No. 17/717,753 filed Sep. 27, 2017, which is hereby incorporated in its entirety by this reference.

In another variation, the camera module 200 can include integrated speakers, which can function to enable audio output. In one implementation, this may be used to simply play audio across an environment. The speakers are preferably individually controllable across the monitoring network, and targeted audio could be played at different regions. In the automatic shopping experience, this can be used in providing augmented audio experiences as a shopper is tracked through a store. The speakers could additionally be used as a human computer interface output when configuring or maintaining the device. For example, a camera module 200 could be set to play an audio signal when the camera module 200 enters an error state.

In another variation, the camera module 200 can include a lighting system, which functions to at provide general lighting. The lighting system could include integrated lights. Integrated lights could be LED lights or other suitable light sources that are built into the camera module 200. The lighting system could alternatively be a set of lighting fixtures such that external lights could be connected to. In some variations, a lighting fixture is designed to power traditional lights such as fluorescent lights, LED lights, incandescent, CFL lights, and the like could be installed and powered by the system. An integrated lighting system can enable the infrastructure of a store to be minimized by not needing to set up separate lighting and camera systems. In some instances, the structural infrastructure used to support and optionally power existing lights can be repurposed for fixturing and/or powering the camera modules 200. When the integrated lighting includes LED lights, installing the camera modules 200 and monitoring network may serve to upgrade environment lighting as well as adding advanced monitoring and CV-driven applications. The enclosure body 210 can be adjusted to support integration of the lighting system as shown in FIG. 19A.

Alternatively, a camera module 200 could have a form factor such that they can be installed into pre-existing lighting fixtures. For example, a "fluorescent tube" camera module form factor shown in FIG. 19C or a "light bulb" form factor as shown in FIG. 19B could be used such that camera modules could be fixtured in place and powered by being inserted into a lighting fixture. Integration of a lighting system can enable the camera module 200 to still provide light like a normal light, but to be enhanced with the sensing and computational capabilities of the camera module 200. These variations may communicate wirelessly or have a network connection port that is exposed when inserted in the electrical fixture.

The lighting could additionally be dynamically and individually controlled by the system. The on/off state, brightness, colors, directionality, and/or other properties could be individually controlled. In combination with the CV-driven capabilities offered through the system, lighting could automatically adjusted based on observed objects in the environment. In one example application, during a power saving mode used within a store at night, the lights could automatically turn on and off or dim based on the location of the people (e.g., workers) present in the environment.

In another variation, the camera module 200 can include a projector system, which functions to project structured lighting. Images can be projected at different locations using a projector system. The cameras of the system are preferably used as a CV-driven sensing input that can be used in various applications, and a projector system can be used as a system output to compliment the computational input from the cameras. The projectors can be individually controlled and can similarly be used in combination with a CV-driven application.

In another variation, the camera module 200 can include a communication module, which functions to facilitate a communication or data network within the environment. The communication module could be a WiFi router used to provide wireless internet within the environment. The communication module could alternatively be a Bluetooth module used for Bluetooth beaconing or other applications. Any suitable type of communication module could be integrated into the camera modules or a portion of the modules to provide a wireless communication channel within the environment.

In a related variation, the camera modules may include a positioning system, which functions to act as a mechanism for local positioning within the environment. For example, an RF-based positioning system could be used to track RFID tags in the environment.

Other alternative sensors and devices could additionally be included such as environmental condition sensors (e.g., smoke alarms, $CO_2$ monitors, temperature, humidity, air quality, etc.) or other components for different functionality.

In one variation, the components of the camera module 200 can be architected and designed for operational redundancy. In the daisy-chaining variation, the system can preferably maintain operation of the camera modules 200 even if one camera module 200 fails. Computational and communication redundancies can enable a sequence of interconnected camera modules to keep operating even when one segment fails. In one preferred implementation, a camera module 200 preferably has redundant power and/or redundant network connectivity. A power control system may manage redundant power. A network switch or hub may coordinate redundant network connectivity.

Figure 20:
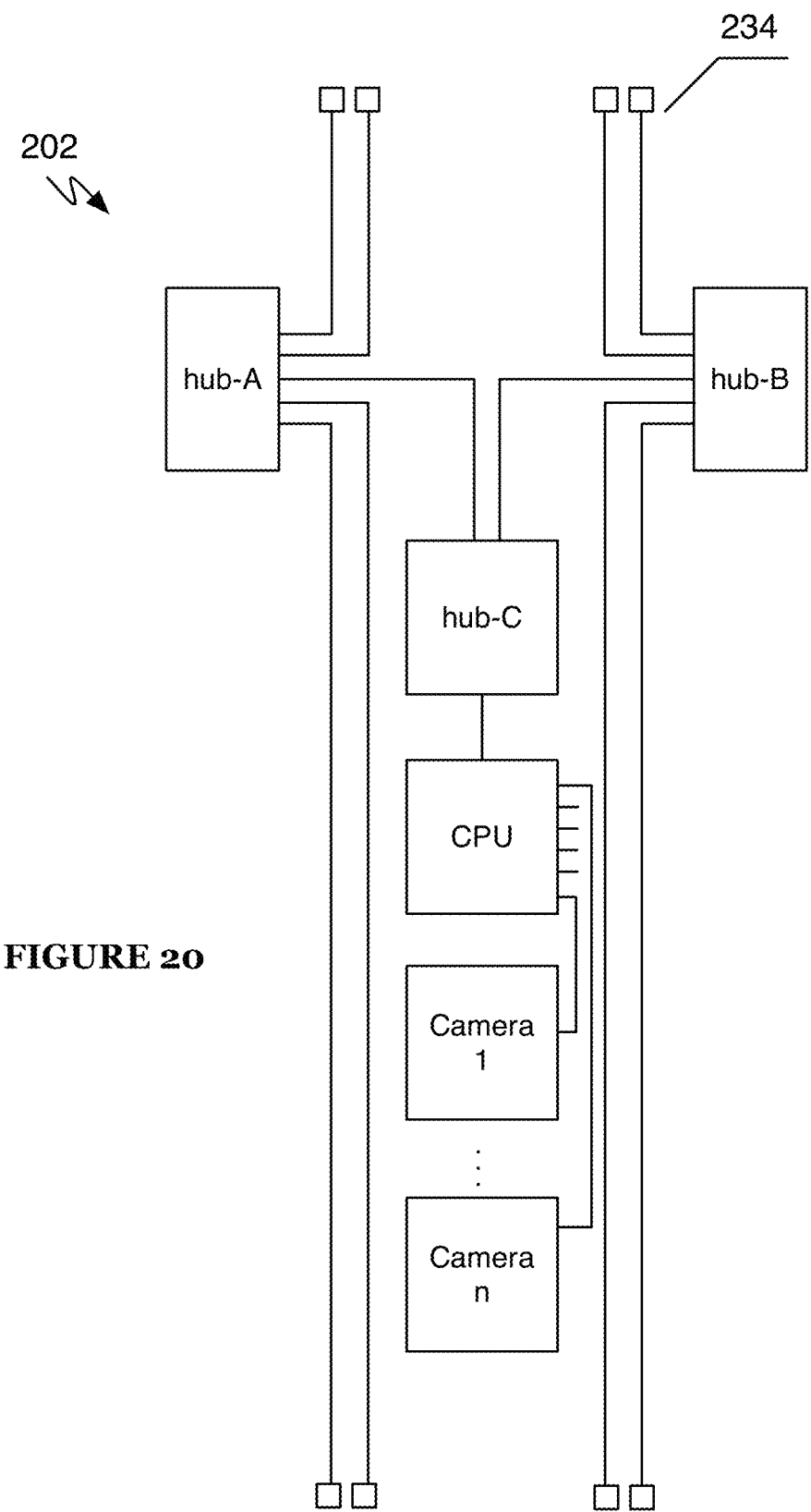
FIGS. 20 and 21 are schematic representations of camera module component architecture for operational redundancy.

In one implementation, a camera module 200 can include a connector on each end for daisy-chaining, a second connector on each end for forming T- and X-shapes, and a second set of each pair of connectors for redundancy (now 8 connectors in all). The pair of pairs can each be collected into a network (e.g., net-A and net-B as shown in FIG. 20). The four connections that make up net-A are connected to a common hub, as are the connections that make up net-B. Hub-A and hub-B are then, in-turn connected to hub-C, which connects to the CPU. The CPU connects to the array of cameras. This configuration can be fully robust against the failure of any single connector or of either hub-A or hub-B. Further, if hub-C or the CPU fail, connectivity to the other camera modules in the system are preserved.

Figure 21:
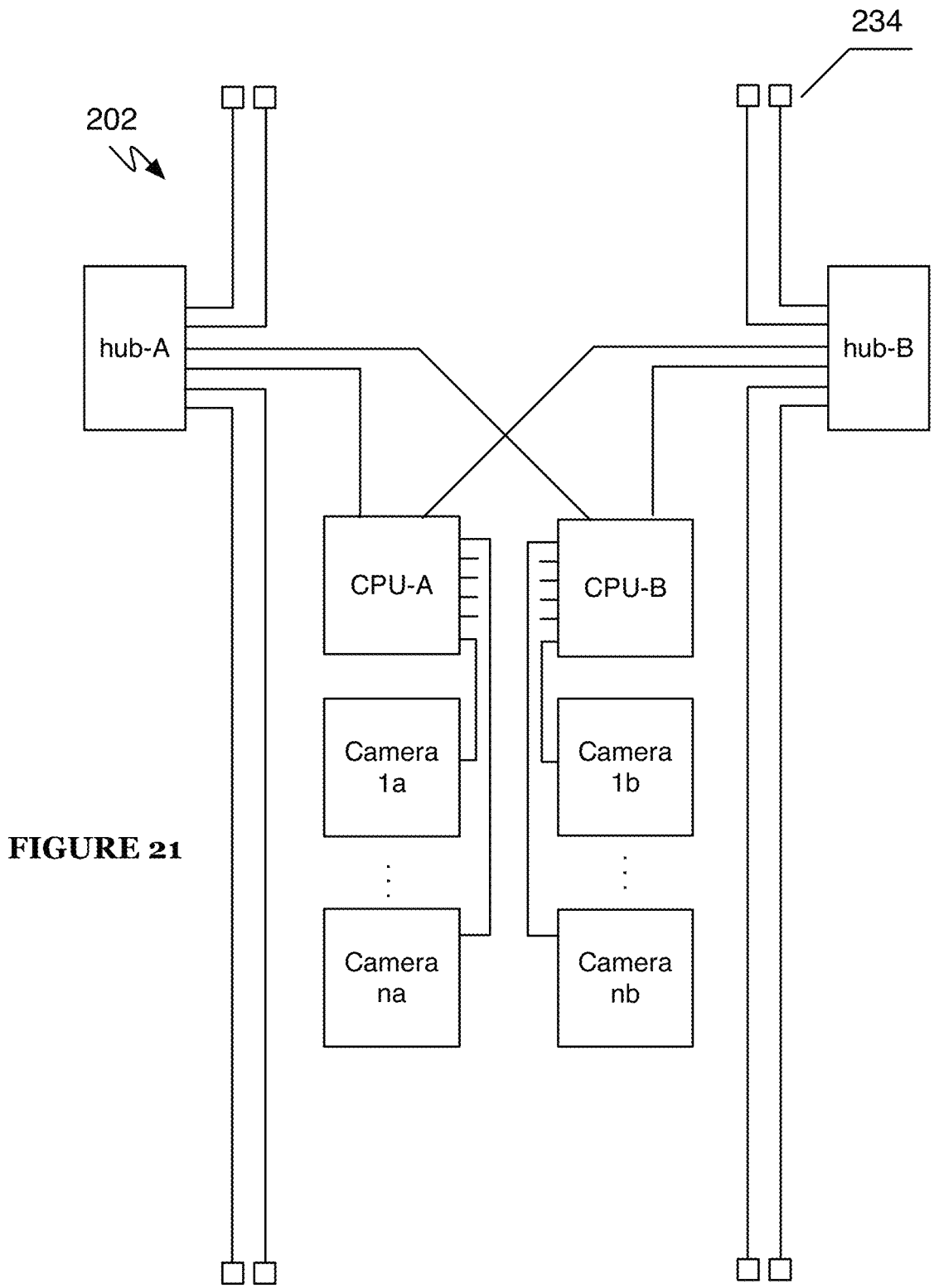

In an alternative implementation that is further enhanced, a second CPU is added, and each of the two CPUs is given authority over managing one-half of the camera elements as shown in FIG. 21. In this implementation, if either hub or CPU fails, half of the cameras will stop operation. The configuration of the camera module 200 and/or network preferably has a significant enough camera density that the camera coverage redundancy is sufficient to handle some camera failures. This second implementation can be further augmented by adding a connection CPU-B & hub-A; and CPU-A & hub-B.

In addition, a camera module 200 can include a hotswap control system such that a camera module 200 may be safely disconnected or connected from the system while the system is live and operating. The hotswap control system can additionally offer continuous protection from short circuits and overcurrent faults. Hotswap control system can enable hardware updates and fixes to the system to be performed without requiring the system to be powered down. As an example, a camera module 200 may encounter an issue where it needs to be replaced. A maintenance worker can rewire network and/or power connections around the camera module (e.g., swapping redundant power or network connections to a subsequent camera module or to a planned replacement), and then remove the camera module causing the issue. A replacement camera module can then be primed for connection by rewiring the network and/or power connections, and then swapped into the monitoring network 100.

Computational Components

The camera module 200 preferably includes a set of computational components used in performing local processing, managing state of the camera module 200 and/or interfacing with the monitoring network, other system elements, or remote resources.

The computational components preferably include a subset of components for processing. The processing components can manage operating state and other operations of the camera modules 200. In one preferred variation, the camera module will include at least one processing unit configured to perform local processing of collected video data. As one aspect, the processing components preferably function to transcode or transform image data from a camera to a format for digital communication with other resources of the system. The processing components can include a general processing unit, a specialized processing unit such as a graphical processing unit (GPU), a dedicated computer vision or deep learning processor, and/or any suitable processing component.

In one variation, the processing performed at the processing components may include transforming raw image data to a compressed media format such as a MPEG video format. In another variation, image data may, at times, be transformed from raw image data to a metadata representation wherein a CV analysis extracts information from the image data. The metadata and/or the digital media format may be communicated to other camera modules and/or system components.

In one variation, the camera modules 200 may be configured to selectively communicate video data based on results of local processing of video data. Media transformation may be dynamically set according to "information quality" of the metadata. The "media quality" of the resulting media format during transformation may be indirectly set based on the "information quality". For example, when the media is transformed into a metadata representation with a high level of confidence, the media format could be reduced to save data storage or bandwidth. As an example, video media may not be stored or communicated if no motion is detected, if no people are present, and/or if other suitable conditions are met.

A camera module 200 may include a processing unit, GPU or other computational elements for each camera, but they may alternatively be shared across cameras.

The computational components can additionally include a communication control system, which can be a networking hub or switch. The networking switch functions to facilitate network configuration and/or communication in and out of the camera hub. Communication is preferably performed over a wired connection to a connection port of the camera module 200, but wireless communication may additionally or alternatively be used. Internal or external DHCP can be used to distribute network configuration to the various components of the monitoring network 100. The networking switch is preferably a networking router that is configured to perform DHCP internally when more than one processor is present, wherein the assignment of IP addresses can be managed internally by a master router of the system, such that the camera routers can be self-assembling from a networking perspective. As shown in FIG. 2, the cameras of the monitoring network may be grouped across a series of such network switches. In one variation, the network switches can implement a form of Spanning tree protocol (STP) or more preferably rapid spanning tree protocol (RSTP). Other suitable network protocols could similarly be implemented.

The computational components of a camera module 200 can additionally include an onboard data storage/memory solution, which can be used in storing media and/or data. The data storage solution could be a hard drive, a solid-state drive, and/or any suitable type of data storage solution. The data storage solution can be used as a temporarily stash of media and/or data from the camera hub. Data storage may be prioritized for potential long-term relevance.

The computational components can include other common components such as onboard memory, data ports, or other components. The camera module 200 may additionally include various user interface elements as described below.

User Interface Elements

The camera modules 200 are preferably designed to simplify configuration, and during normal usage, direct interaction with a camera module 200 may not be needed. The camera module 200 may, however, include user interface elements to either output information or enable direct control of the camera module 200. User interface elements may include basic elements such as buttons or user physical device input elements, displays, indicator lights, speakers for audio signals, and the like.

In one preferred variation, the camera module 200 may include a control channel mechanism that can enable connected control of a camera module 200 through a secondary device. A control channel mechanism can function to alleviate camera modules from being built with extra components for the rare situations where manual control is required. Control and configuration can preferably be performed through the network connection of a camera module 200 as well. A personal computer, a smart phone, tablet, or the like may be able to connect to the camera module 200 and used as a medium for interfacing with an individual camera module 200. A physical connection may be used in the situation where network connectivity to the camera module 200 is not working or is not available. A user can directly connect to the camera module 200 to collect diagnostics, access data, update configuration, control the device, and/or otherwise interact with the camera module 200. A control channel connection can be done through a cable such as a wired connector (e.g., a serial port, RJ-45, or a USB connection) or a wireless connection such as Bluetooth or a Wi-Fi network established by the camera module 200, or any suitable communication channel. In one variation, the camera of the camera module 200 may be used as data input channel to the camera module 200. For example, a smart phone app may enable configurations to be set and then an encoded message can be visually communicated to the camera module 200 through the display or a light of the camera. Output from the camera module 200 may be indicated through indicator lights or other suitable feedback mechanisms.

Connection Port and Connections

Figure 22:
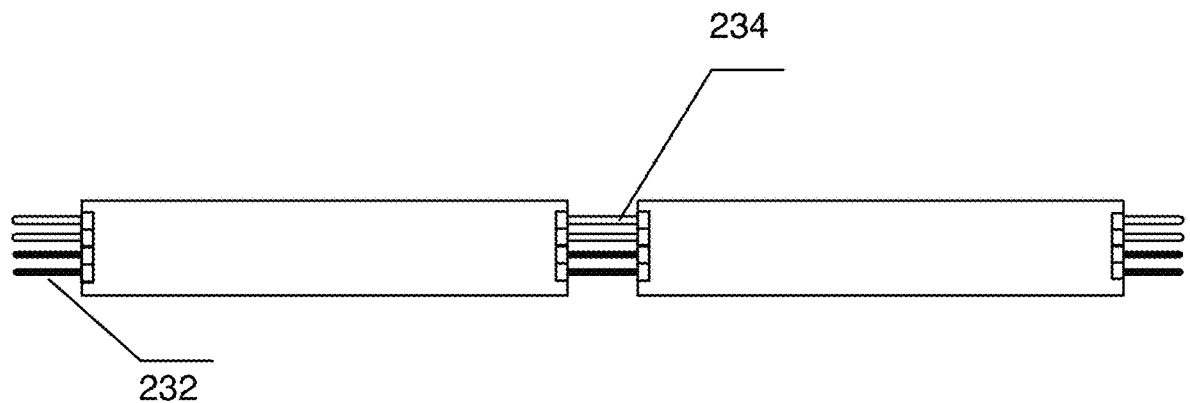
FIG. 22 is a schematic representation of power and network connectivity cabling connecting camera modules.
Figure 23:
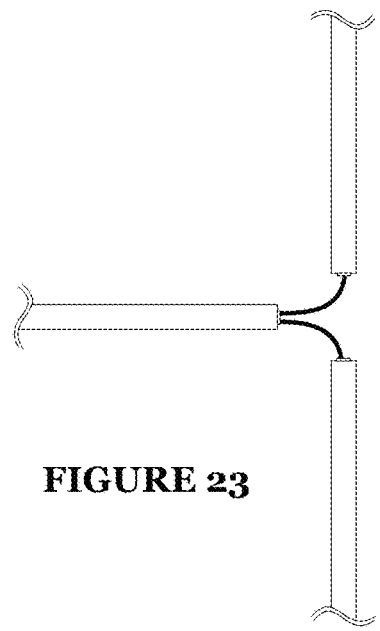
FIG. 23 is a schematic representation of a monitoring network branch.

The connection ports 230 functions to facilitate ease of wiring of the camera modules by utilizing serial connections of a sequence of camera modules 200. Preferably, there are two connection ports which functions to allow there the camera module to serve as a power and/or network connectivity relay wherein input power or network connectivity is received from one connection port 230, utilized by the camera module, and relayed to at least a second connection port 230. This may be used for serial connections of camera modules 200 as shown in FIG. 22. There may additionally be three, four, or any suitable number of connection ports 230 where the additional connection ports 230 can be used to branch delivery of power and/or network connectivity (e.g., creating T or X branches) as shown in FIG. 23. Different connection ports 230 of a camera module 200 are preferably substantially the same. The connection ports 230 may also be non-directional where any connection port 230 may be used as an input or output (i.e., supply or relay) of power and/or network connectivity. For example, the direction a camera module 200 is connected may make no difference. Alternatively, directionality may be built into the design of the camera module.

Figure 24:
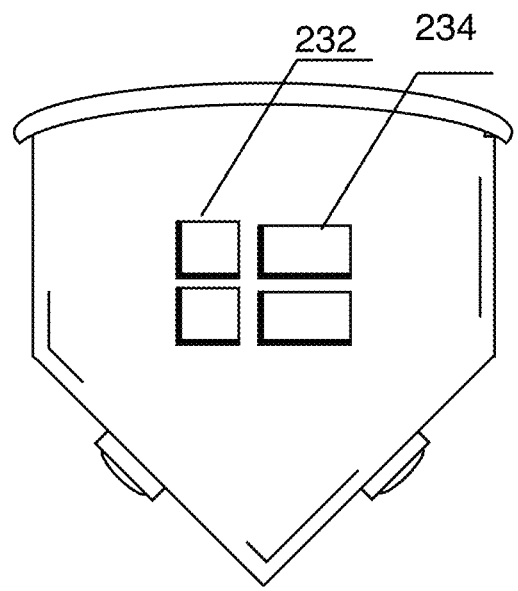
FIG. 24 is a schematic representation of a connection port.

As one example, instead of dealing with running power and networking lines to one hundred to a thousand different devices to monitor a store (which may be accompanied with a high level of installation complexity), one to twenty-five "chains" of camera modules may be used to monitor a store. The set of camera modules that are part of the monitoring network 100 are preferably interconnected through wired connections. The wired connection is preferably used in electrically coupling camera modules for delivering electrical power and/or data communication. The camera modules 200 preferably include at least two connection ports 230 such that a chain of camera modules can be connected. Each connection port 230 may be exposed on one side of a camera module 200 as shown in the end view of a camera module 200 in FIG. 24. A first connection port 230 preferably functions to provide power and/or network connectivity, while a second connection port 230 functions to pass along connectivity to power and/or network access to subsequent camera modules. The camera module 200 may be designed such power and/or network connections are independent of connection port 230. For example, a camera module rail could be connected in a series of camera modules with any suitable orientation. In some variations, the camera modules 200 may include at least three connection ports 230 such that a chain of camera modules can branch off in different directions.

In one preferred variation, each connection port 230 includes both a power connection port 232 and a communication connection port 234. The power connection ports 232 functions to form a connected power delivery network across a network of connected camera modules. The communication connection ports 234 function to form a communication network across a set of cameras mounted within the environment.

As one alternative variation, a connection port 230 may include a power connection port 232, wherein communication may be facilitated wirelessly or in another manner. As another alternative variation, a connection port 230 may include only a communication connection port 234, wherein power may be facilitated in another manner (e.g., having a separate power cord). In the described variations, there may be redundant or secondary power connection ports and/or communication connection ports. Redundant connections may not be inherently redundant or failover but may be designed where port usage is equally prioritized or selected in an alternative manner. Alternatively, one of connection ports may be a primary one used unless some event triggers use of the secondary/redundant one. As shown in FIG. 22, one preferred variation can have two power connection ports 232 that connect a DC power connection and two communication connection ports 134 that connect two network cable connections.

Multiple distinct cables may be connected to a connection port 230. Alternatively, an integrated cable may be used to connect to a connection port 230 and thereby one or more power connection port(s) and/or communication connection port(s). In one implementation, the wired connection can be a power over ethernet (PoE) port. The wired connection could alternatively be a USB port (e.g., for a USB Power Delivery connection) or any suitable wired connector. In another variation, a custom cable type could be used that bundles power and network connectivity.

For the power connection port 232, the camera module 200 preferably includes a power control system that functions to regulate or otherwise manage power supplied to the components of the camera module. The power control system further functions to relay or pass power supply between connection ports. For example, a 60 VDC power supply received through a first power connection port 232 is relayed through the power control system (e.g., power management circuitry) to at least a second power connection port 232. Another camera module connected to the second power connection port 232 can receive power through that connection. The power control system will preferably step down voltage to one or more desired voltage levels to drive components of the camera module or more specifically components of a camera sub-system unit 202. Additionally, the camera module 200 or a camera sub-system unit 202 can be designed to handle sufficient current loads in the event that a camera module is at the beginning region of a chain camera modules 200. For example, the power system of the camera module and/or a camera sub-system unit 202 can include a high-current capacity channel that carries current between connection ports 230.

With redundant power connection ports 232, the power control system can additionally include a power connection selection system. The power connection selection system (i.e., a power switch system) can function to appropriately select at least one of the power connections for use. In the event of a failure or a drop in current and/or voltage, the power connection selection system transfers to use of a live power connection. The power connection selection system can be implemented through a static circuit design that automatically changes based on configured power thresholds. The power connection selection system could alternatively actively sense and control selection of a power connection. In this variation, use of a communication connection port could be remotely monitored and/or controlled.

Related to this, the power control system can include a hotswap controller as discussed herein to manage the addition or removal of a camera module and/or a camera sub-system unit 202 while the system is running.

A distinct power port could additionally or alternatively be included in a camera module 200. In one variation, the camera module 200 can include a supplemental power port, which may be used in place of a power connection port 230 used in serial connection. In some cases, a branch or segment of a monitoring network 100 can surpass the power limits of the communication connection and so a supplemental power connection can be used to supplement power supply. A power connection port 232 could similarly be connected to a different power supply such that network connectivity may be continuous along a series, but multiple power supplies are used supply power across sub-regions of the series of camera modules 200 as shown in FIG. 3.

For the communication connection port 234, the camera module 200 preferably connects a wired network connection to the communication control system described above. The communication control system is preferably configured to coordinate data communication of data collected from the at least one camera of the camera module instance. Data communication can be either direction and can use any suitable communication protocol. The communication connection port 234 may be an ethernet connection port with an RJ45 connector. Data communicated can include video media data, CV-derived metadata, operating parameters of the camera module, commands or data relayed to the camera module, software/firmware updates, and/or other suitable forms of data.

In one implementation, camera sub-system units 202 can additionally include unit connection ports 236 so that they can be connected to connection ports 230 exposed on the camera module 200 and connect to other camera sub-system units 202 as shown in FIGS. 14A and 14B.

Figure 25:
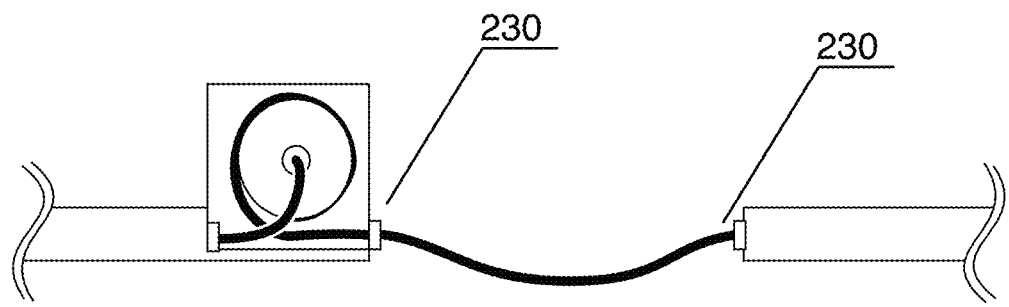
FIG. 25 is a schematic representation of an exemplary wire management solution.

The system may additionally include a wire management mechanism that can be integrated with or used in combination with the camera modules. The wire management mechanism functions to facilitate wire management when connecting multiple camera modules. In one variation, the wire management mechanism can be a static structure that can be used to hold and store excess wiring. The wire management mechanism preferably holds a small coil of wire near where the wire connects at the connection port as shown in FIG. 25. The wire management mechanism could additionally function to reduce stress on a wire near the connector. In another implementation, the system includes an extendable wire cartridge that has a spring-loaded or manually wrapped coil of wire that can be connected to the camera module 200. Preferably, a set of cartridges with different lengths of wire may be provided such that someone connecting can select a cartridge that is minimally sufficient to cover the wired connection. Excess wire can then be stored within the cartridge body.

Local and Remote Computing Systems

In addition to the camera modules 200 and connections to form the monitoring network, the system will generally include or interface with one or more power sources and computing systems. A power source can be a power supplies the electrical current for powering the camera modules. The computing system may include local computing systems that functions as a central on-premise computing resource. The local computing system can be a single master system but could alternatively be multiple on-premise computing resources operating in cooperation. A local computing system could facilitate mass media storage and more intensive computing capabilities. Operations that depend on significant computational power can be delegated to an on-premise computing resource. The local computing system can additionally manage the network of camera modules. Additionally or alternatively, the system can include a remote computer resource, which functions as a cloud hosted computing resource. The remote computing resource can facilitate data sharing between different environments, enhancement of computer vision and machine intelligence, remote monitoring of multiple sites and/or other features. An alternative implementation can have the camera modules acting in fully distributed manner without dependence on a central computing resource.

3. Method

The system preferably includes a number of operating modes that facilitate various features of the system. These features function to address various aspects of the system such as setting up the system in a new environment, operating the system in a new environment, and maintaining the new system. In particular, various operating processes of the system can be applied to automatically calibrate the monitoring network, calibrate a camera topology of the monitoring network 100 within an environment, and manage media across the monitoring network within the monitoring network.

Automatically Calibrating the Communication Network

A method for automatically calibrating the communication network of the monitoring network functions to make enrollment of a new camera module a streamlined process. The monitoring network is preferably self-assembling and adaptive to changes. Adding a new camera module 200, removing a camera module 200, and/or reconfiguring a camera module can all trigger automatic reassignment of IP addresses. As discussed above, switches within the camera modules can use internal or external DHCP to distribute network configuration to the various components of the monitoring network.

Calibrating Camera Topology

A method for calibrating camera topology of the monitoring network functions to enable the relative orientation and positioning of cameras to be at least approximately determined. Cameras can automatically detect proximity to other cameras, overlapping fields of view, and/or relative positioning of observable fields of view. CV-based tracking of objects across multiple cameras can be used in determining relative position and orientation. Detection of a networking topology may additionally be used.

Calibrating camera topology can include calibrating a camera field of view to an absolute position of the environment, which functions to map locations in an environment to observable locations of a camera. In one implementation, a calibration beacon can be moved through the environment. The beacon preferably records its absolute position (e.g., a GPS coordinate or a location coordinate relative to the inside of a building). The beacon additionally transmits or shows a visibly observable marker so that the absolute position can be associated with cameras that visually observe the beacon.

Calibrating the camera topology can be extended to include generating an environmental topology. In a variation, where the system includes object classification capabilities, the location of items, people, structures, and/or other features can be determined. As an exemplary application of the environmental topology. A store could generate a planogram of sold items and that planogram could be updated in substantially real-time.

Additionally, calibrating camera topology of the monitoring network can include reporting on health of camera topology. Reporting on the health of the camera topology can include detecting holes in coverage (e.g., locations where a camera does not have visibility). Reporting the health of the camera topology can additionally include detecting unnecessary camera redundancy at particular locations.

Managing Media within the Monitoring Network

A method of managing media within the monitoring network during distributed CV-based processing functions to augment data communication and computational processes. As one objective, the method for media management preferably preserves observational data so that longitudinal analysis of information can be performed. The preservation of observational data can allow for observations to be stored or represented in different forms.

As a treelike network with a trunk at a local computing system, the monitoring network preferably has connectivity to a local computing system. Distributed CV processing can be used to reduce the amount of communicated media. Additionally, storing media locally can enable media to be requested on demand from different camera modules. Managing media preferably includes dynamically tiering communication of a media representation. A media representation can be a media file of varying mediums and formats but could additionally or alternatively include metadata descriptions. The tiering of communications can be based on camera prioritization. Camera prioritization can be influenced by processing of the image data (e.g., detecting a change or detecting a person present), directions from nearby cameras (e.g., for tracking objects between cameras), or directions from other resources (e.g., local processing system prioritizes or deprioritizes a camera based on some state change).

One implementation of dynamically tiering communication of a media representation can include: updating image data on scene change (e.g., motion); communicating high quality media data when there is low CV-processing confidence; communicating reduced quality media data with supplemental metadata when there is moderate CV-processing confidence; communicating a metadata-only representation when there is high CV-processing confidence. Here a CV-processing confidence threshold is used as an exemplary condition, but alternative or additional conditions could be used.

Similar tiering can also be applied to storage of observational data at different locations of the monitoring network. For example, a camera module may increase its storage capacity by altering the format of stored data to accommodate.

4. System and Method for Optical Enhancement

A system and method 300 for optical enhancement for ubiquitous video monitoring functions to enable a network of cameras to be efficiently installed and operated for collecting media, in particular, video and still images.

The system and method 300 preferably applies a set of optical systems to alter optical imaging of distinct regions of an environment in a coordinated manner. Preferably, the system and method 300 can collect image data for one or more target regions in an environment where the different target regions are optically altered according to collective goals around working with the image. A first preferred target region is the surface of a shelf, which may be holding various items like in a store. A second target region can be the walking space where customers move and interact within the environment. Other target regions could be counters, tables, bins, conveyor belts of point of sale kiosks, upright computer kiosks, and the like.

In some variations, the system and method 300 are used to monitor a large structure or region with multiple cameras. For example, the face of a shelf can be monitored with multiple cameras. The corrective optical systems 320 used in multiple cameras can enhance control over the nature of monitoring this area. Corrective distortion and/or focal plane adjustment are two exemplary factors that can be adjusted for a particular scenario. This can be of particular relevance when the cameras are mounted above a shelf.

Figure 26:
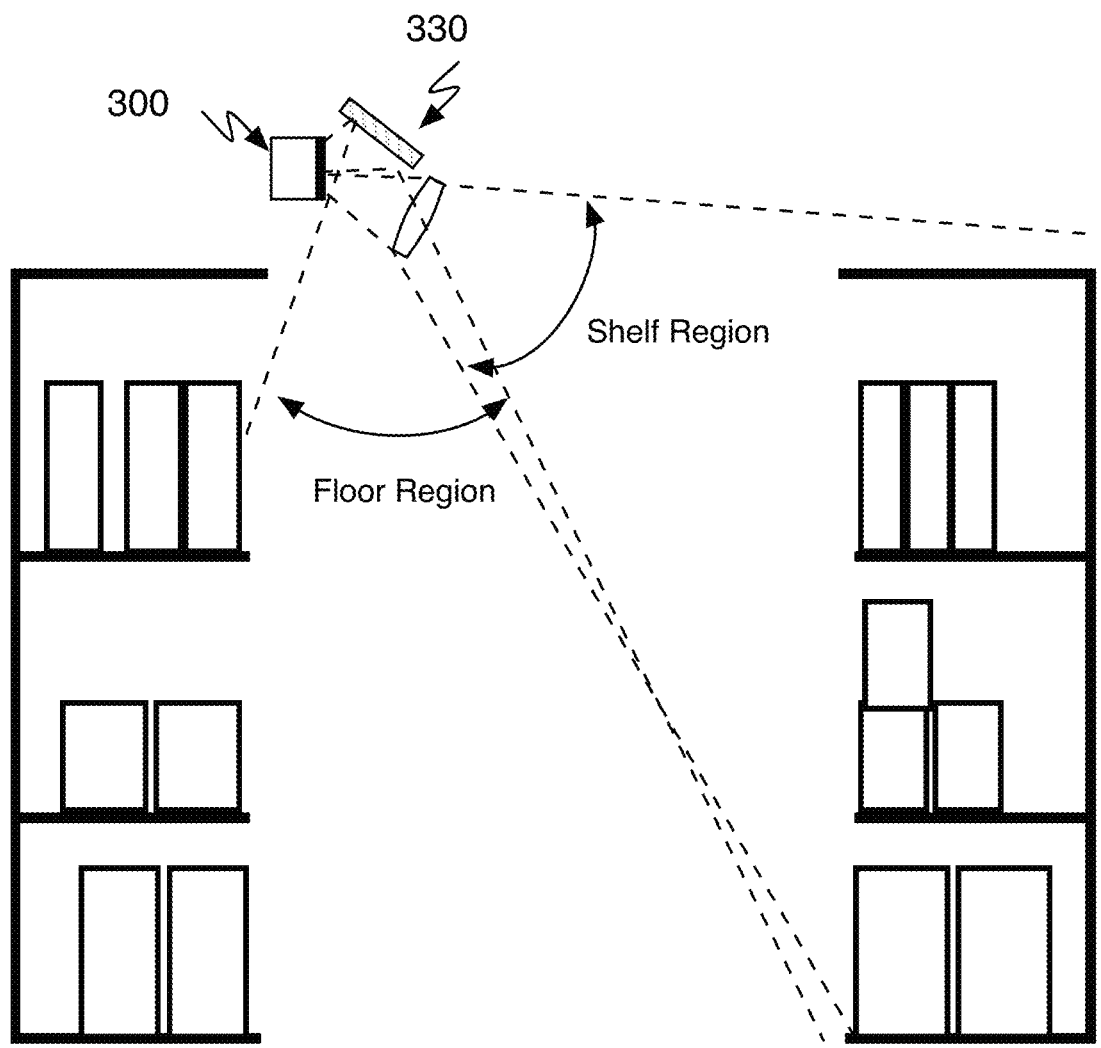
FIGS. 26-29 are generalized schematic representation of variations of split-field optical systems.

Additionally or alternatively, a camera with a set of optical systems may be used to create distinct focus planes from a single camera unit. For example, a single camera mounted above a grocery store aisle as shown in FIG. 26, may have a first focus plane corrected for imaging of a shelf and a second focus plane corrected for people and items moving across the floor of the aisle.

The system is primarily described collecting video data. As used herein, 'video' might mean a common video format such as NTSC, PLA, MPEG, 4K, etc. Video may also mean a sequence of individual still images whose place in time are monotonic. Those images may similarly be in a wide range of formats, including Raw, JPG, PDF, GIF, BMP, HEIF, HEVC, WebP, and/or other suitable media formats.

The system could additionally be applied to a single camera and may additionally alternatively be applied to other forms of image sensing.

As above, the system and method 300 may have particular applications in systems designed for ubiquitous monitoring across an environment.

The system and method 300 can additionally have general applicability to just video or image surveillance or capture systems. For example, the system and method 300 could be employed to enable a camera system to efficiently take an image of a shelf of items periodically for any suitable type of application.

The system and method 300 has particular applications to imaging a shelf or vertically arranged items, as is a common situation in stores. More specifically, the system and method 300 can be used for enhancing imaging while capturing the shelf, items on the shelf, or other target region from an off-angle perspective as is common when cameras are mounted with an aerial perspective above the target region. Other scenarios or target subjects may alternatively be used, but herein the shelf use-case is used as the primary example.

As one potential benefit, the system and method 300 can produce a camera system that has improved focus and/or distortion effects. In many commerce environments, camera systems are positioned above the region of interest or in other out-of-the-way regions of the environment. As such, the regions of interest for video monitoring often happen along planes non-parallel to the sensor planes of the camera system. Imaging of shelves from a ceiling mounted camera system is one such example. Focus of items stacked in the shelves may normally have different levels of focus. The system and method 300 may correct the focus plane to more closely align with the plane of a shelf or other target region. Keystone distortion of a shelf face or other target region additionally will generally occur with traditional approaches. The system and method 300 may reduce perspective distortion for a target region like a shelf face. This can make the pixel density across the shelf face to be uniform or at least more uniform.

Figure 18A:
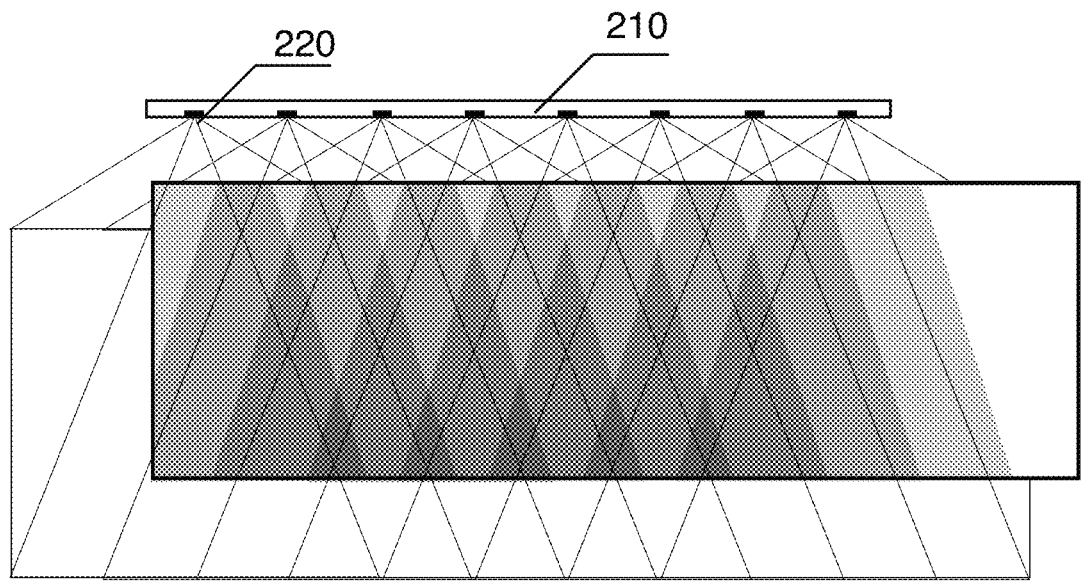
FIG. 18A is a schematic representation of camera coverage and camera coverage overlap for a shelf as collected by cameras.
Figure 18B:
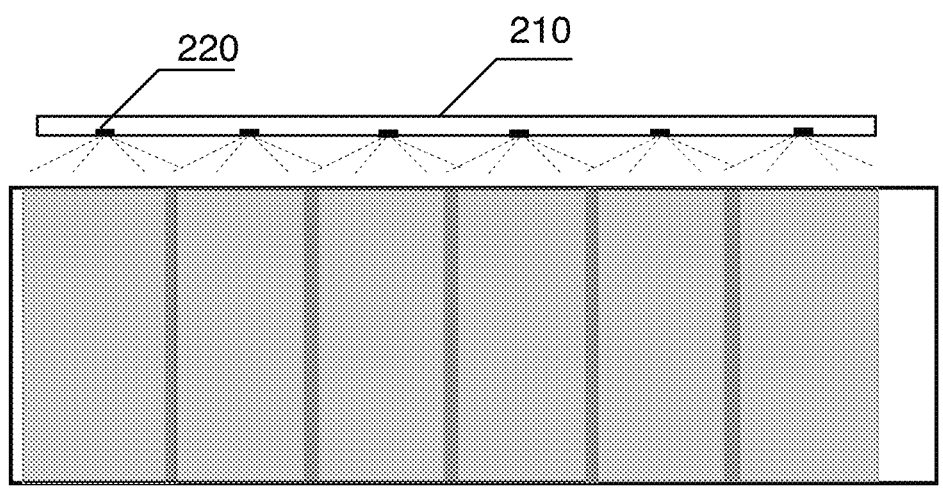
FIGS. 18B-18D are schematic representations of camera coverage and camera coverage overlap for a shelf as collected by cameras after use of a corrective optical system.
Figure 18C:
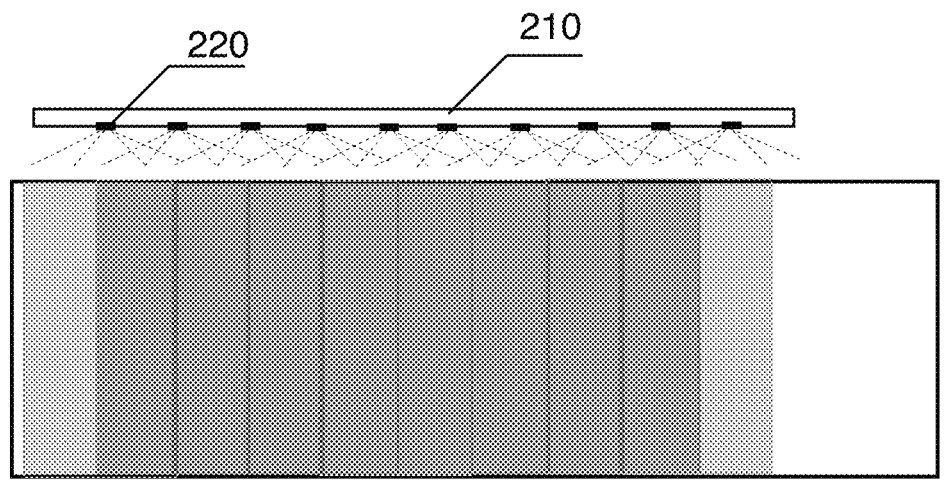
Figure 18D:
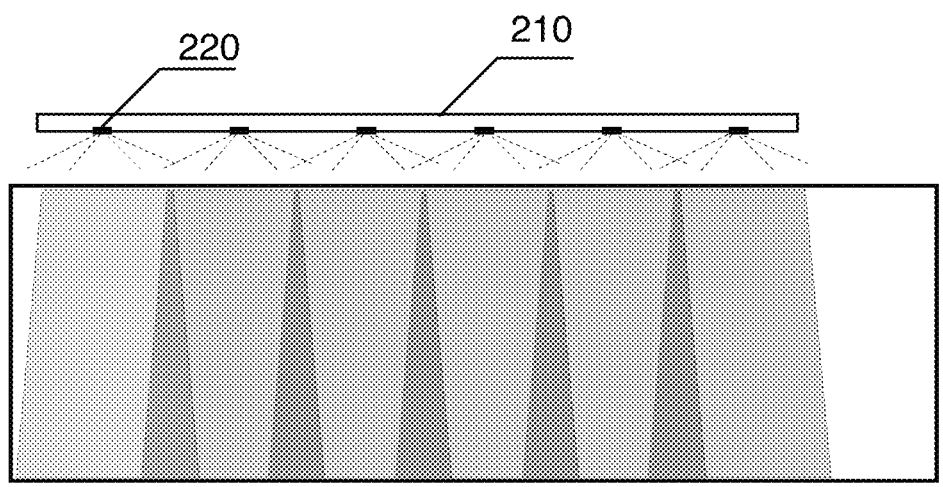

As a related potential benefit, perspective correction may be applied across multiple cameras with configured arrangement such that the imaging of the target region is controlled in a more uniform manner. As opposed to an arrangement of cameras capturing shelf images with keystoned overlaps of shelf images (e.g., manifesting as trapezoidal and/or triangular overlap regions), the system and method 300 can reduce or correct distortion such that arrangement of cameras can be set based on more parallel imaging of the target region as shown in FIGS. 18B, 18C, and 18D. As a result, camera coverage resulting from overlap is a more uniform (e.g., rectangular regions of overlap). Camera coverage can thereby be modified based on desired types of coverage like 100% coverage, 200% coverage, 300% coverage, or other suitable forms of coverage.

As another potential benefit, the system and method 300 can enable individual cameras to have customized imaging of distinct target regions wherein the focus plane and/or distortion correction is applied in at least one region of the image plane. This can be used in situations where a shelf could be monitored with perspective correction and focus plane alignment while the ground region can be monitored with a focal distance customized for tracking people.

In the variations described above and below, the system and method 300 may have the added benefit of more efficient use of cameras where optical systems are customized for monitoring specific scenarios within a store. When deploying a ubiquitous imaging system across an environment, especially a large environment like a store, the number of cameras and devices to appropriately observe the space may be a high number. Camera efficiency can be critical in reducing physical component cost as well as reducing the amount of data for processing and storage. As such, more efficient camera coverage, better camera coverage alignment, more uniform pixel density of objects of target regions, and other factors resulting in part from the optical system of the system and method 300 may all function to reduce camera numbers.

As one example, a system employing the optical enhancement may reduce camera count by 25%-50% which saves on physical compute resources to drive the cameras which includes smaller footprint on processing, data storage, enclosure size/complexity, data and power connectivity.

A system for optical enhancement for ubiquitous video monitoring of a preferred embodiment preferably includes a set of optical systems configured to customize optical imaging for coordinated monitoring of different regions. In one variation, the different regions may be sub-regions of one continuous subject of interest. In another variation, different regions like a shelf and the ground may have different expected The system may primarily function to coordinate the collection of image data from different regions in a manner that is customized to the challenges for CV-driven applications. In particular, the system has applications to imaging within a place of commerce like a grocery store, convenience shop, or other suitable type of store where there are shelves of items lined along a defined plane not parallel to the image sensor of a camera. The system preferably includes a multi-camera variation and a split-view variation, which may be used individually or in combination.

Multi-Camera Variation

In a first preferred variation, the system preferably includes: a set of cameras 310, the cameras being configured with a relative camera arrangement; and each camera including at least one corrective optical system 320 as shown in FIG. 17. The multi-camera variation, functions to coordinate the optical modification of imaging by the cameras to account for the relationship of the images captured across the cameras 310. For example, the multi-camera variation can have particular applications when used in combination with a monitoring network and/or camera module described above. Capturing images or video of a subject-of-interest across an environment may be achieved with higher level of camera usage efficiency. For example, a wider area of the shelf could be monitored with a fewer number of cameras.

The variation can function to perform high resolution video monitoring of a structure from an off-axis camera system using multiple cameras. This variation has particular benefit for capturing images of long continuous structures with surfaces that are non-parallel to the camera such as a shelf when monitored from a camera mounted above the height of the shelf. Through this system variation, a long shelf face can be monitored with substantially uniform image resolution across the target region (e.g., shelf face). For example, the pixel density of objects at the bottom of the shelf, after perspective correction, can be substantially similar pixel density of objects at the top shelf. More specifically, this variation can perform video monitoring of a target region like a shelf face with substantially uniform image resolution across the target region.

The multi-camera variation may additionally have wider applications in other camera array applications. Herein, the multi-camera variation primarily addresses the application to imaging within a commercial space and in particular monitoring a shelf from a camera position that is displaced horizontally in front of the shelf face and above the shelf face (or region of interest on the shelf face). Other suitable scenarios such as those described in could alternatively use this multi-camera variation.

A camera 310 functions to capture an image of the environment. The camera 310 preferably includes at least a camera sensor. In one variation, the cameras 310 may be integrated into a single connected structure. As one implementation, the set of cameras 310 may be integrated into a camera module as discussed above sometimes grouped as camera pairs. Furthermore, multiple camera modules and/or other multi-camera devices could be aligned, connected, or otherwise arranged so as the set of cameras 310 includes multiple distinct devices that operate in combination. Accordingly, in another implementation, the system may include a monitoring network of interconnected camera modules as discussed above where each camera module comprises of distinct subset of cameras from the set of cameras.

As one preferred arrangement, the set of cameras are arranged with a corresponding angle orientation (relative to expected camera mounting configuration). The set of cameras may be directed with defined sensor planes in a coplanar arrangement. More specifically, the defined sensor planes of the cameras can be coplanar within some expected tolerances. For example, a line of cameras may be mounted along a line and directed in the same general orientation towards different positions of a shelf. In another variation, the arrangement of the cameras may be such that the cameras with tangential angle orientations along some path like an arc or an arbitrary path. For example, a ring of cameras may circumscribe a circular shelf.

Video or image data is collected from the set of cameras 310 and is preferably communicated to a centralized processing system.

The corrective optical system 320 functions to alter or transform the imaging of the environment. The transformation is preferably customized to the objectives in the environment. This transformation may involve perspective correction, focal plane adjustment, setting of focal distance and/or other suitable field of view adjustments.

In the case of monitoring shelves, the corrective optical system 320 is preferably configured with perspective correction. A shelf when captured by a camera above the shelf face will be captured with a perspective distortion that results in the top of the shelf having more pixel density resolution (e.g., appearing larger) and the bottom of the shelf having lower pixel density resolution (e.g., appearing smaller).

The corrective optical system 320 can be a perspective correction optical system. In one implementation, the perspective correction optical system can be a shift lens optical system or more preferably a tilt-shift lens optical system. Shifting and/or tilting of a lens can produce corrective distortion that can counteract normal distortions. This may be a single lens optical system but could alternatively include multiple stage optical system. A captured image of a shelf can be corrected with reduce keystoning as shown in FIG. 8D or more preferably substantially removed keystoning (e.g., vertical edges of shelf are parallel within 5 degrees) as shown in FIG. 18B. The perspective correction could be adjusted for various situations. For example, if monitoring a long bin of items, the perspective correction optical system could correct for keystoning of the horizontal surface of the bin. If monitoring an area that is at a non-perpendicular angle (e.g., in a gravity-defined orientation) such as seats in an auditorium, perspective correction could similarly be applied for diagonally aligned surfaces.

As one set of enhancements offered through perspective correction, the perspective transformation can be configured to reduce perspective distortion of a target subject like a shelf face. In the case of a shelf face, the defined vertical sides of a resulting captured image of the shelf face will have angles less than two degrees from vertical. Though any suitable level of correction may alternatively be used.

Similarly, the imaging resolution of a shelf (or target region) are altered as a result of perspective correction, which can improve image resolution uniformity across a target subject. For example, the captured image of FIG. 18B will have objects at the bottom shelf imaged with similar pixel densities compared to objects on the top shelf.

One potential benefit of the use of a corrective optical system 320 and more specifically at least a perspective correction optical system can be that camera coverage of a shelf face or other suitable target region may be better managed. When the perspective correction optical system is applied across a set of arranged cameras, the image planes can be transformed to have adjacent overlap that is controlled through coordination of optical correction system and camera arrangement. More specifically, a tilt-shift optical system can be configured to apply at least a perspective transformation, while the relative camera arrangement and the perspective transformation are cooperatively configured to image of a target subject (e.g., a shelf face).

The adjacent overlap (e.g., overlap of camera coverage by neighboring cameras) can be controlled for consistent camera coverage across the vertical face of the shelf face. When not corrected, keystoning can result in different levels of camera coverage. As shown in FIG. 18A, the camera coverage of a shelf, when viewed by a camera module 200 that is mounted above and in front of a shelf face, can have regions of coverage with small redundancy and very high redundancy when not corrected. In this figure regions of darker color indicate the degree of camera coverage overlap or redundancy. In this example, bottom regions sometimes have 400%, 300%, 200%, or 100% camera coverage while the top of the shelf sees 200% or 100%. While such redundancy may be permissible in many situations, some scenarios may benefit from more control of camera coverage.

With correction, the image plane overlap at the target subject is preferably rectangular or is at least more uniform (e.g., reduced keystoning) compared to image plane without perspective correction.

The optical system and the relative camera arrangement can be cooperatively configured for different levels of adjacent-overlap of camera coverage. More specifically, the perspective transformation of the optical system and the relative camera arrangement is configured from some level of adjacent camera overlap. One targeted overlap profile may target 100% camera coverage, 200% camera coverage, 300% camera coverage, and/or any suitable variation. The configured overlap may be based on expected camera mounting position. In the shelf use case, the set of cameras are generally mounted above and in front of shelf face.

In a minimizing variation, coverage of a target subject may be designed to have 100% coverage of the target subject. Ideal adjacent overlap can be configured for perfect alignment with zero overlap. However, in normal conditions, some amount of adjacent overlap may be preferable to allow for variability. Accordingly, the adjacent overlap between is generally configured to be less than 25% and in some implementations may be configured to be 10% or less. As shown in FIG. 18B, the spaced arrangement of cameras can be configured to align the adjacent camera overlap to be less than a quarter of the imaged shelf face. This can function to minimize redundancy, which can reduce the number of cameras.

As shown in FIG. 18C, the spaced arrangement of cameras may alternatively be configured to align the adjacent camera overlap to promote a particular degree of camera coverage redundancy. To achieve camera redundancy, the relative camera arrangement and the perspective transformation can be cooperatively configured for at least 50% adjacent camera overlap in imaging a target subject like a shelf face. The adjacent camera overlap may be limited to no more than a certain threshold like 60%. In this example, each region of covered shelf is viewable by two cameras (e.g., 200% coverage). Even without perfect distortion correction as shown in FIG. 18D, a corrective shift optical system can enhance the control of camera coverage.

The corrective optical system 320 may additionally or alternatively be configured with focal plane adjustment wherein the focal plane can be reoriented to align with a desired target subject. In a standard imaging approach, objects on a shelf will have different distances from the camera and thereby will generally not all be absolutely focused. The focal plane adjustment is preferably achieved through a tilted lens and more preferably a tile-shift lens. This may be a single lens optical system but could alternatively include a multiple stage optical system. Focal plane adjustment is preferably used in combination with perspective correction discussed above. Preferably, the focal plane is adjusted to more closely align with a defined surface of the shelf face. In one implementation, a tilt-shift optical system is configured to align the focal plane within ten degrees of the shelf face, though any suitable degree of alignment may be performed. As a result, the items visible at the front of the shelf may be having more uniform levels of focus.

The focal plane adjustment correction could be adjusted for various situations. In some variations, the target subject may be defined as a horizontal surface region, where the set of cameras are mounted above and off-center from a horizontal surface region. Corresponding adjustments may be made to address such imaging for each camera and optical system and across camera arrangement. For example, if monitoring a long bin of items, the focal plane can be adjusted to align with horizontal surface of the bin. In another variation, the target subject may be defined as a diagonal surface region. In other words, the target subject can be along a plane nonparallel or perpendicular angle (e.g., in a gravity-defined orientation) such as seats in an auditorium. In one example, the focal plane could similarly be aligned with the defined angular plane of the target region.

Split-View Variation

Figure 27:
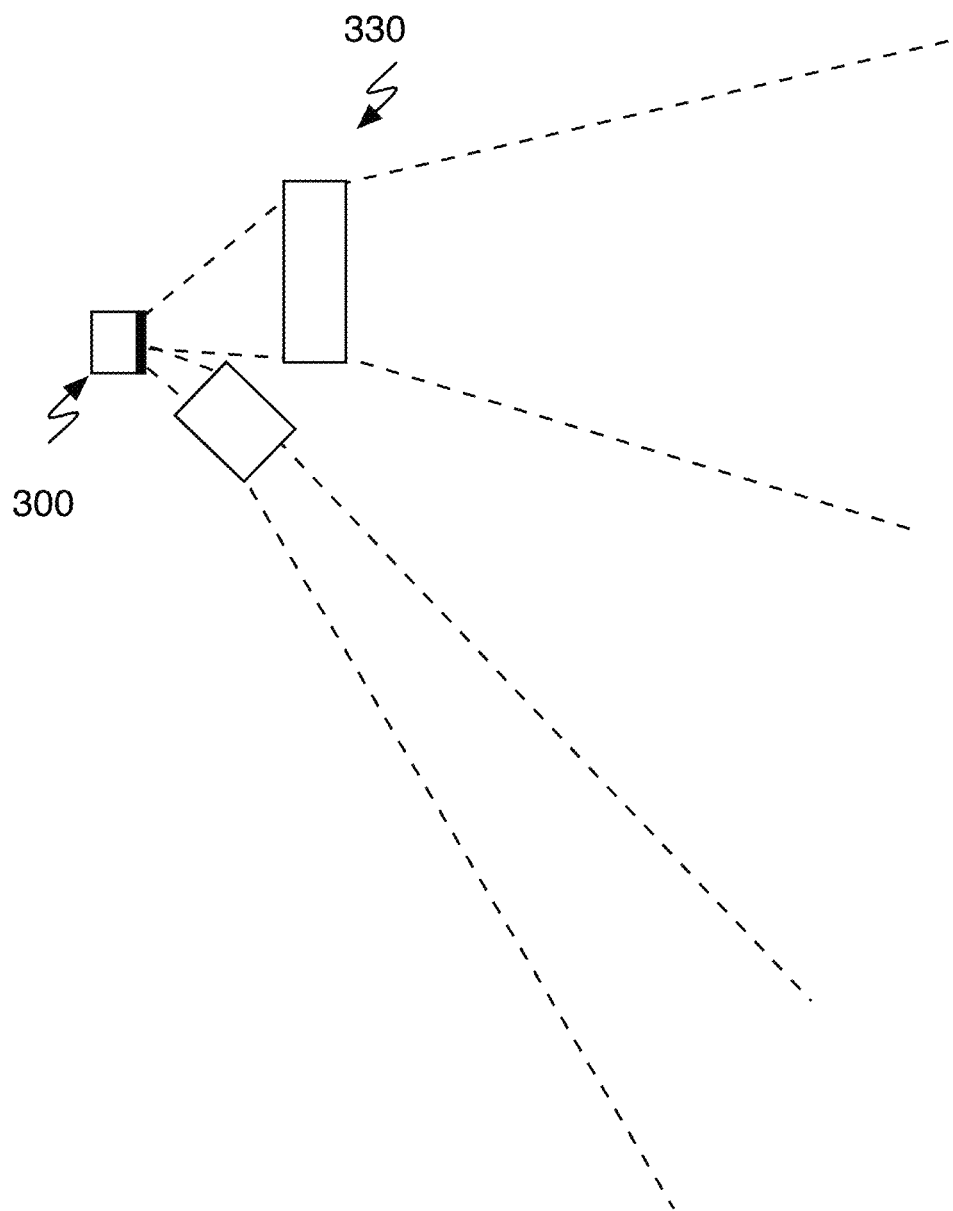

In a second preferred variation, the system preferably includes a camera 300 with a split-view optical system 330 as shown in FIG. 27. A split-view optical system 330 as described herein has at least two regions of an image captured with distinct optical transformations.

This split-view variation can function to customize focus distance, focal plane orientation, perspective distortion correction, or other optical properties within subregions of an image. A split-view variation is preferably useful in efficiently utilizing area of an image sensor for capturing different regions of interest in the near proximity.

The split-view variation may be used individually, in combination with the multi-camera variation, and/or more specifically in combination with a monitoring network of camera modules as discussed above. The split-view optical system 330 is preferably a variation of a corrective optical system 300. Accordingly, the corrective optical system 320 with the multi-camera variation may further use a split-view optical system 330.

Within a split-view optical system 330, different "views" or regions of the field of view are transformed in different ways. The types of transformations can include perspective correction, focal plane adjustment, field of view adjustment, redirection, focal distance adjustment, and/or other suitable optical transformations. These optical transformations can be combined in any suitable combination.

The split-view optical system 330 preferably produces a set of imaged regions. In one preferred variation, a camera 300 can be configured to capture at least a first imaged region and a second imaged region from the split-view optical system 330. In other variations, a third imaged region or any suitable number of imaged regions can be produced by the split-view optical system 330. An imaged region as used here refers to the sub-region of image data resulting from optical transformation applied to a portion of the field of view of a camera sensor.

Figure 28:
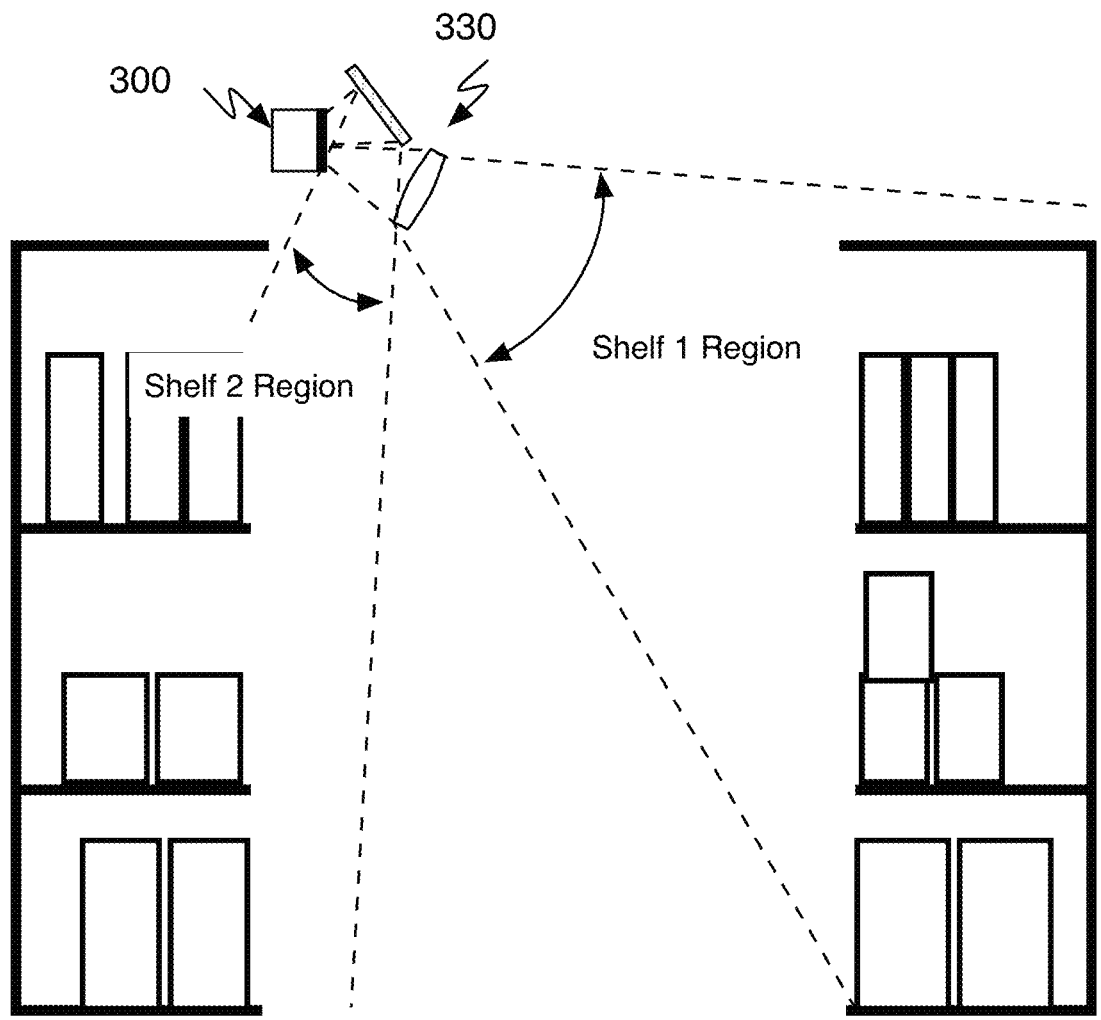
Figure 29:
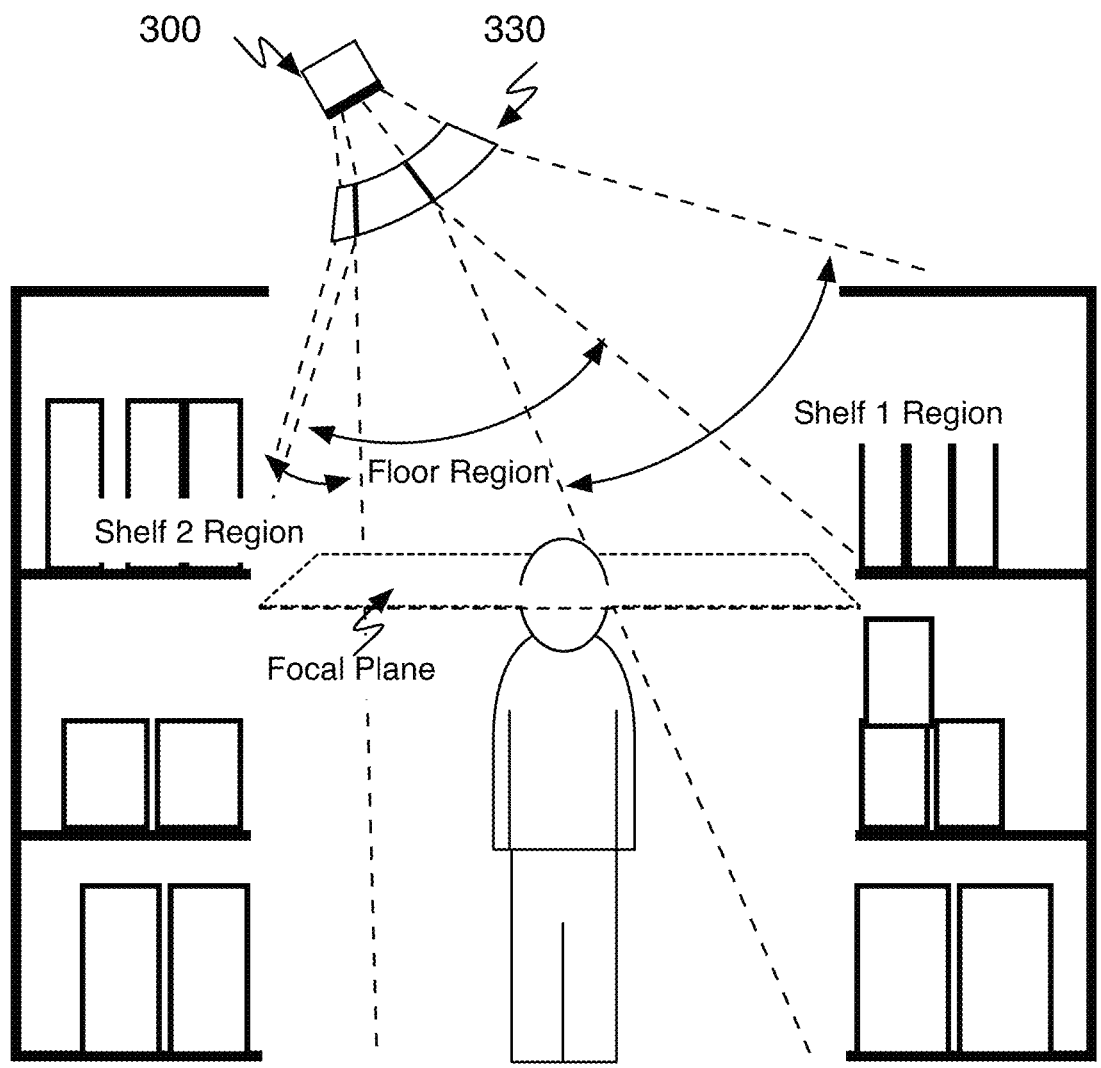

The imaged regions resulting from distinct optical transformations may have distinct transitions or edges. The resulting image may be processed with each imaged region treated as a distinct image where the relevant image portion can be isolated from the source image. Alternatively, an optical transformation may be graduated so as to provide gradual transitions. The regions may be image data from distinct areas in the environment as shown in FIG. 28. Alternatively, a region may include image data redundant from another region. For example, the floor region may include image that also includes shelf image data as shown in FIG. 29.

An optical sub-system of a split-view optical system 330 for perspective correction and/or focal plane adjustment can preferably apply the above variations. A tilt-shift optical sub-system is preferably used to apply at least one of these corrections. The split-view optical system 330 preferably includes at least one tilt-shift optical sub-system. When used in imaging a shelving aisle, the tilt-shift optical sub-system can be localized to an image region isolated to primarily a shelf face.

An optical sub-system can be used to adjust the field of view. In one variation, a region may have narrowed field of view to focus on a region of interest. In another variation, a region may have widening field of view. A wide field of view optical subsystem may be useful in situations, where an area in the environment should be monitored is not directly next to the other imaged areas, and can be viewed with reduced image resolution. For example, a secondary shelf face.

An optical sub-system may apply a redirection transformation wherein a mirror or other optical system redirects the optical path for the region to another space.

In the shelf aisle use case, the camera and split-view optical system 330 may be configured to capture a first shelf face, a floor region with user traffic, and/or possibly a second shelf face. Each region may have particular optical transformations.

Preferably, at least one of the shelves is monitored with an objective of item identification and item interaction classification and detection. For example, the image region capturing the first shelf is preferably suitable for detecting the items on the shelf and/or the event of a customer removing or adding an item to the shelf. In one preferred variation, an imaged region capturing a shelf face is optically transformed by a tilt-shift optical sub-system of the split-view optical system 330.

As shown in FIGS. 26 and 28, a tilt-shift optical sub-system optically transforms a portion of the cameras field of view. This may generally be used for capturing shelf face images. There may be a variety of options in using the other imaged regions.

In one variation, the at least second imaged region can be optically transformed in a way giving it an effective focal plane different from the first imaged region. The focal plane could be further transformed through a second tilt-shift optical sub-system.

In another variation, the split-view optical system 330 can include a mirror that is configured to form a second imaged region by redirecting a sub-region of the field of view as shown in FIGS. 26 and 28. This may be used to redirect the field of view to a more useful region such as a second shelf face, the floor surface, or any suitable region. The focal distance and/or focal plane of the second region could also be adjusted through further optical transformations. Similarly, the field of view or other optical properties could similarly be set for the second imaged region with an optical sub-system of the split-view optical system 330.

In one variation, the split-view optical system 330 may be used so that a camera can monitor two opposing shelves, which is generally applicable when the camera is mounted between and above two opposing shelf faces. In this variation, a camera can be configured to capture a first imaged region and a second imaged region from the split-view optical system 330. The first imaged region preferably captures a first shelf face, and the second imaged region preferably captures a second shelf face. The first imaged region from the split-view optical system 330 can be optically transformed through a tilt-shift optical sub-system configured to apply perspective correction of the first shelf face.

The second shelf, which may be opposing the first shelf, may similarly be monitored with corresponding objectives. In one variation, at least one shelf face may be monitored with an objective of detecting general shelf interaction. The location or region of interaction may additionally be detected. For example, a second shelf may be monitored with the intended objective of detecting when a customer interacts with that shelf, where further classification of this event may be left to another camera with a different perspective configured for item classification and event classification.

In another variation, the split-view optical system 330 may be used so that a camera can monitor a shelf and a floor region. This is generally applicable when the camera is mounted in front of and above a shelf face. In this variation, each camera can be configured to capture a first imaged region and a second imaged region from the split-view optical system 330. The first imaged region preferably captures the shelf face, and the second imaged region preferably captures the floor surface. The first imaged region from the split-view optical system 330 can be optically transformed through a tilt-shift optical sub-system configured to apply perspective correction of the shelf face. The second region may be altered in various ways to appropriately sense activity on or near the floor.

Preferably, the second imaged region is preferably optically transformed by an optical subsystem that is configured to adjust the focal plane substantially parallel to a floor surface. This may function to monitor where people move through an environment. A floor imaged region may be further customized so that the focal plane is at an approximate height of people's faces as shown in FIG. 29. For example, the focal plane of this imaged region may be set to be at least five feet.

The different regions may be arranged so that they are imaged as a sequence of rectangular images collected on one source image. The different regions could alternatively be optically transformed so that regions are reflected in different quadrants of a source image or in any suitable location.

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

I claim:

1. A system for video monitoring across an environment comprising of:
    a set of camera modules mounted and interconnected as a monitoring network within the environment;
    wherein each camera module instance of the set of camera modules comprises of:
        an enclosure body with a length greater than three feet;
        a plurality of cameras mounted with a spaced-arrangement across the length of the enclosure body and with an outward view of the environment, and
        at least a first connection port and second connection port, wherein the first connection port and the second connection port are on opposing ends of the length of the camera module instance, and wherein the each of the first and second connection ports comprise of a power connection port, a communication connection port, and at least one additional redundant connection port; and
    wherein the camera modules of the set of camera modules serially connect through the connection ports of adjacent camera modules.

2. The system of claim 1 wherein the at least one redundant connection port comprises a redundant power connection port; and wherein each camera module comprises of a power control system that manages power supplied to the components of the camera module and passes power from a power connection port or redundant power connection port of the first connection port to a power connection port and redundant power connection port of the second connection port.

3. The system of claim 1 wherein the at least one redundant connection port further comprises a redundant communication connection port; and wherein each camera module instance further comprises of a communication control system configured to coordinate data communication of data collected from the plurality of cameras of the camera module instance and pass along network communication access to subsequent camera modules connected to the camera module instance.

4. The system of claim 1, wherein the power system further comprises a hotswap control system.

5. The system of claim 1, wherein each of the first and second connection ports comprise a communication connection port; and wherein each camera module instance further comprises of a communication control system configured to coordinate data communication of data collected from the plurality of cameras of the camera module instance.

6. The system of claim 1, wherein the camera module further comprises mounting mechanisms for horizontal suspension of the camera module from an elevated structure.

7. The system of claim 6, wherein the enclosure body has a length between five and six feet.

8. The system of claim 6, wherein the camera module further comprises a lighting system.

9. The system of claim 6, wherein the spaced arrangement comprises a first subset of the cameras mounted with a first angle orientation and a second subset of cameras mounted with a second angle orientation.

10. The system of claim 6, wherein the camera module comprises at least a subset of cameras mounted with an angle orientation configured to capture a first shelf face of a first shelf when the camera module is mounted above and in front of the first shelf.

11. The system of claim 6, wherein the camera module comprises at least a subset of cameras mounted with an angle orientation configured to capture a first shelf face of a first shelf and a second shelf face of a second shelf when the camera module is mounted above and between the first and second shelves.

12. The system of claim 6, wherein the plurality of cameras have a subset of cameras paired in a depth perception arrangement.

13. The system of claim 6, wherein the cameras further comprise a tilt-shift corrective optics system.

14. The system of claim 13, wherein the tilt-shift corrective optics system is configured to correct distortion of an imaged shelf when mounted above and in front of the shelf face; and wherein the spaced arrangement of cameras is configured to align adjacent camera overlap to be less than a quarter of the imaged shelf face.

15. The system of claim 1, wherein the monitoring comprises of at least ten camera modules connected in series.

16. The system of claim 1, wherein the camera module network comprises of at least two types of camera modules.

17. The system of claim 1, wherein the camera module instances comprise at least one processing unit configured to perform local processing of collected video data.

18. The system of claim 17, wherein the camera modules are configured to selectively communicate video data based on results of local processing of the collected video data.

19. The system of claim 1, wherein the connection ports are non-directional thereby the power connection port and redundant power connection port of the first and second connection ports can be used as input or output of power and the communication connection port and the redundant communication connection port can be used as input or output of data communication.

* * * * *